(12) United States Patent
Maeda et al.

(10) Patent No.: US 7,654,466 B2
(45) Date of Patent: Feb. 2, 2010

(54) SEMICONDUCTOR MEMORY CARD, SEMICONDUCTOR MEMORY CONTROL APPARATUS, AND SEMICONDUCTOR MEMORY CONTROL METHOD

(75) Inventors: Takuji Maeda, Neyagawa (JP); Shinji Inoue, Neyagawa (JP); Yoshiho Gotoh, Osaka (JP); Jun Ohara, Imabari (JP); Masahiro Nakanishi, Yawata (JP); Shoichi Tsujita, Kyoto (JP); Tomoaki Izumi, Neyagawa (JP); Tetsushi Kasahara, Katano (JP); Kazuaki Tamura, Toyono-gun (JP); Kiminori Matsuno, Katano (JP); Koichi Horiuchi, Nara (JP); Manabu Inoue, Hirakata (JP)

(73) Assignee: Panasonic Corporation, Osaka (JP)

( * ) Notice: Subject to any disclaimer, the term of this patent is extended or adjusted under 35 U.S.C. 154(b) by 813 days.

(21) Appl. No.: 10/553,725

(22) PCT Filed: Sep. 13, 2004

(86) PCT No.: PCT/JP2004/013703

§ 371 (c)(1),
(2), (4) Date: Oct. 19, 2005

(87) PCT Pub. No.: WO2005/029311

PCT Pub. Date: Mar. 31, 2005

(65) Prior Publication Data

US 2006/0221719 A1     Oct. 5, 2006

(30) Foreign Application Priority Data

Sep. 18, 2003    (JP)    ............................. 2003-325811

(51) Int. Cl.
*G06F 12/00*    (2006.01)

(52) U.S. Cl. ............................. 235/492; 711/1; 711/100
(58) Field of Classification Search ................. 235/492; 711/1
See application file for complete search history.

(56) References Cited

U.S. PATENT DOCUMENTS 5,640,529 A    6/1997    Hasbun (Continued)

FOREIGN PATENT DOCUMENTS

JP    6-124174 A    5/1994

(Continued)

OTHER PUBLICATIONS

"Information Technology—Volume and File Structure of Disk Cartridges for Information Interchange", Nov. 1994, pp. 1-40, second edition, ISO/IEC 9293, ISO/IEC, Switzerland.

(Continued)

*Primary Examiner*—Daniel A Hess
(74) *Attorney, Agent, or Firm*—Smith Patent Office

(57) ABSTRACT

A host information memory is provided in a semiconductor memory card and a data write start address and a data size supplied by an access unit are stored. A free physical area generation section determines whether or not to perform erasing of an invalid block of a nonvolatile memory when writing of data based on the data write start address and data size, and determines the number of blocks to be erased. When erasing, writing of data and erasing of invalid blocks are simultaneously performed with respect to different memory chips. Erase process of data, herewith, can be optimized and high speed access from the access unit to a semiconductor memory card can be realized.

3 Claims, 20 Drawing Sheets

U.S. PATENT DOCUMENTS

| | | |
|---|---|---|
| 6,725,322 B1 | 4/2004 | Shiraishi et al. |
| 2002/0051394 A1 | 5/2002 | Tobita et al. |
| 2004/0030825 A1 | 2/2004 | Otake et al. |
| 2004/0193774 A1 | 9/2004 | Iwata et al. |

FOREIGN PATENT DOCUMENTS

| | | |
|---|---|---|
| JP | 11-191297 A | 7/1999 |
| JP | 2002-202912 A | 7/2002 |
| JP | 2003-044351 A | 2/2003 |
| JP | 2003-058417 A | 2/2003 |
| WO | WO 00/50997 A | 8/2000 |
| WO | WO 2006045807 A2 * | 5/2006 |

OTHER PUBLICATIONS

"OSTA Universal Disk Format Specification", Feb. 1997, pp. 1-112, revision 1.50, Optical Storage Technology Association, Santa Barbara, USA.

* cited by examiner

FIG. 3

| | | EB |
|---|---|---|
| 0 | Data area (512 B) | MR (16 B) |
| | Data area (512 B) | MR (16 B) |
| | Data area (512 B) | MR (16 B) |
| | Data area (512 B) | MR (16 B) |
| | ⋮ | ⋮ |
| 31 | Data area (512 B) | MR (16 B) |

SEMICONDUCTOR MEMORY CARD, SEMICONDUCTOR MEMORY CONTROL APPARATUS, AND SEMICONDUCTOR MEMORY CONTROL METHOD

TECHNICAL FIELD

The present invention relates to a semiconductor memory card, a semiconductor memory control apparatus, and a semiconductor memory control method.

BACKGROUND ART

Various kinds of recording media for recording digital data such as music contents and visual data are there, such as magnetic disks, optical disks, and magnetic optical disks. A semiconductor memory card, which is one type of such recording media, uses a semiconductor memory such as a flash ROM (Read Only Memory) as a recording element and makes it possible to reduce a size of a recording medium; therefore, semiconductor memory card is rapidly spreading with a focus on small size mobile apparatuses, such as digital still cameras and mobile telephone terminals.

Since data stored in a semiconductor memory card are managed by a file system, users can easily treat the stored data as a file. There is a FAT file system, used as a conventional file system, disclosed in ISO/IEC9293, "Information Technology-Volume and file structure of disk cartridges for information", 1994. In addition, there are UDF (Universal Disk Format), NTFS (New Technology File System), and the like described in OSTA Universal Disk Format Specification Revision 1.50, 1997. The semiconductor memory card with data managed by such file systems can share a file between apparatuses that interpret the same file system; therefore, data can be given/received between apparatuses.

There has been a problem in that the file system needs to perform a two-stage operation in which data is first erased in rewriting data and thereafter data is written, resulting in much time consumed until finishing writing completely.

As a method for solving such a problem, for example, a semiconductor storage device disclosed in Japanese Unexamined Patent Publication No. 11-191297 is heretofore known. The present invention has a plurality of nonvolatile memories, performs erasing in a second nonvolatile memory when performing writing in a first nonvolatile memory, and performs rewriting data in a short time by processing them in parallel. However, in this conventional technology, the erase process is performed in parallel regardless of the data size to be written in a memory chip. For example, in a NAND type flash memory, time for erasing one erase block (normally, 16 KB) is to be 2.0 mSec. Accordingly, there has been a drawback in that it takes lots of time to perform erasing in the case of a small data size and, therefore, the entire writing time becomes longer after all.

DISCLOSURE OF INVENTION

The present invention has been made to solve the above-mentioned problems. The present invention is directed to a semiconductor memory card used by being connected to an access unit. The semiconductor memory card comprises: a host interface section which sends a control signal and data to the access unit and receives a signal from the access unit; a nonvolatile memory which includes a plurality of nonvolatile memory chips and in which a plurality of continuous sectors is grouped to be a block as a minimum unit of data erasing; a memory controller which controls erasing, writing, and reading of data with respect to the nonvolatile memory; and a host information memory which temporarily stores a data write start address and a data size value given by the access unit. Herein, the memory controller includes a free physical area generation section which determines whether or not to perform erasing of invalid blocks of the nonvolatile memory based on the data write start address and the data size value temporarily stored in the host information memory, and simultaneously performs writing of data to one nonvolatile memory chip and erasing of blocks of another nonvolatile memory chip when performing erasing of the invalid blocks.

The present invention is also directed to a semiconductor memory control apparatus which is used in a semiconductor memory card and is used by being connected to a nonvolatile memory which includes a plurality of nonvolatile memory chips and in which a plurality of continuous sectors is grouped to be a block as a minimum unit of data erasing. The semiconductor memory control apparatus includes: a host interface section which sends a control signal and data to an access unit and receives a signal from the access unit; a memory controller which controls erasing, writing, and reading of data with respect to the nonvolatile memory; and a host information memory which temporarily stores a data write start address and a data size value given by the access unit. Herein, the memory controller includes a free physical area generation section which determines whether or not to perform erasing of invalid blocks of the nonvolatile memory based on the data write start address and the data size value temporarily stored in the host information memory, and simultaneously performs writing of data to one nonvolatile memory chip and erasing of blocks of another nonvolatile memory chip when performing erasing of the invalid blocks.

The present invention is also directed to a semiconductor memory control method in a semiconductor memory card having a nonvolatile memory which includes a plurality of nonvolatile memory chips and in which a plurality of continuous sectors is grouped to be a block as a minimum unit of data erasing. The semiconductor memory control method includes the steps of: temporarily storing a data write start address and a data size value given by an access unit in a host information memory; determining whether or not to perform erasing of invalid blocks of the nonvolatile memory based on the data write start address and the data size value temporarily stored in the host information memory; and simultaneously performing writing of data to one nonvolatile memory chip and erasing of blocks of another nonvolatile memory chip when performing erasing of the invalid blocks.

According to the present invention, the number of erase blocks is determined based on a write start address and a write size obtained from the access unit, and the erase block is erased in accordance with data writing. Consequently, erasing can be performed without exposing the erase time and without lowering the processing performance, and a free block can be increased. A high-speed access to a semiconductor memory card, therefore, can be realized.

BRIEF DESCRIPTION OF DRAWINGS

FIG. 3 is an explanatory view showing a configuration of erase blocks according to Embodiment 1 of the present invention.

BEST MODE FOR CARRYING OUT THE INVENTION

Hereinafter, embodiments of a semiconductor memory card, a semiconductor memory control apparatus, and a semiconductor memory control method according to the present invention will be described with reference to the drawings.

Embodiment 1

Figure 1:
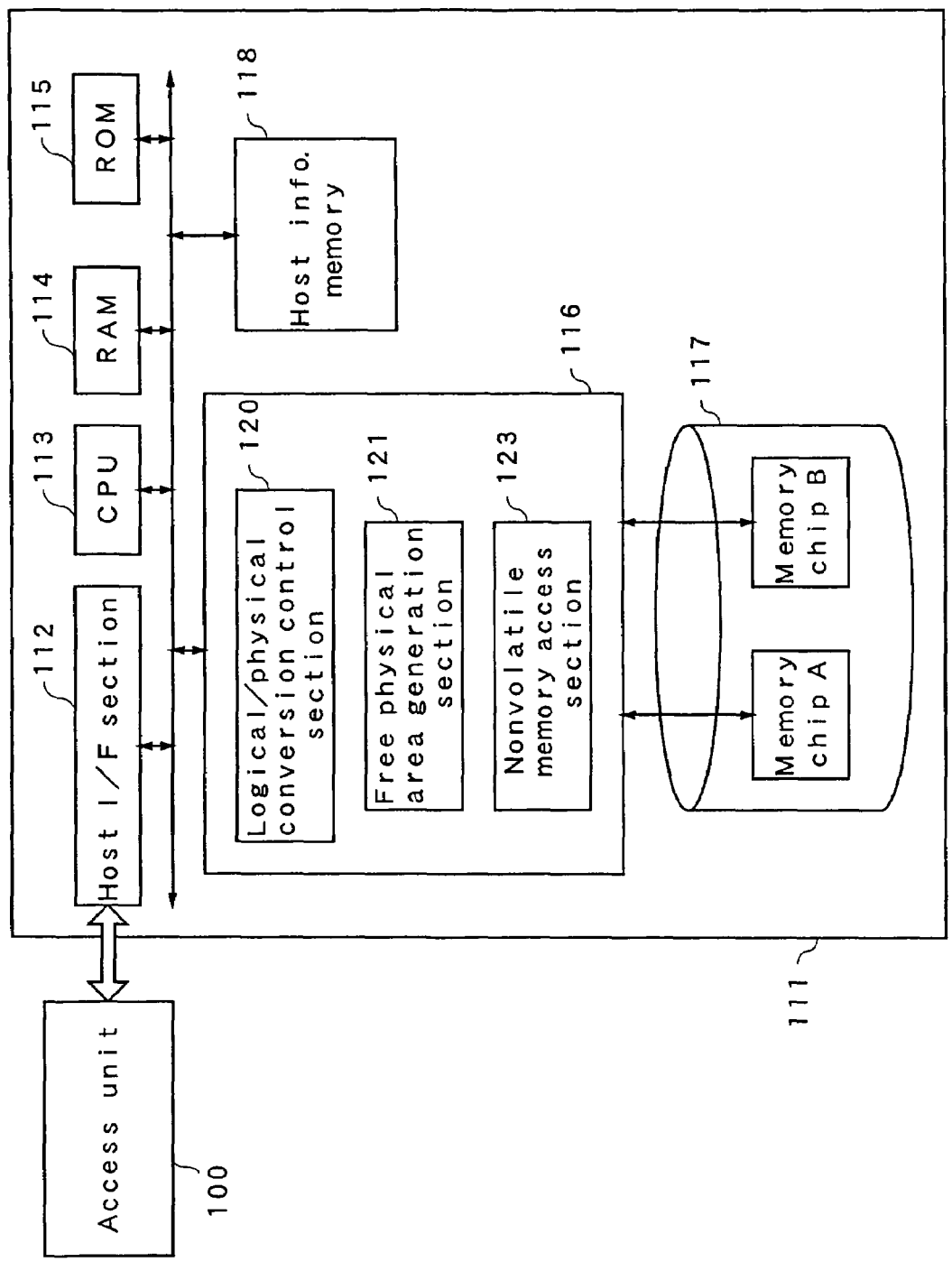
FIG. 1 is an explanatory diagram showing a semiconductor memory card and an access unit according to Embodiment 1 of the present invention.

FIG. 1 is a block diagram showing a semiconductor memory card and an access unit according to Embodiment 1 of the present invention. In FIG. 1, an access unit 100 is connected to a semiconductor memory card 111. The semiconductor memory card 111 includes a host interface (I/F) section 112, a CPU 113, a RAM 114, a ROM 115, a memory controller 116, a nonvolatile memory 117, and a host information memory 118. The host interface section 112 is an interface for sending/receiving control signals and data to/from the access unit 100. The ROM 115 stores a program for controlling the semiconductor memory card 111. The program runs on the CPU 113 using the RAM 114 as a temporary storage area. The memory controller 116 is an element for controlling the nonvolatile memory 117. The nonvolatile memory 117 is a data storage area in the semiconductor memory card 111. The memory controller 116 includes a logical/physical conversion control section 120, a free physical area generation section 121, and a nonvolatile memory access section 123. The logical/physical conversion control section 120, as will be described later, includes a logical/physical conversion table 131 and an entry table 132. Further, the free physical area generation section 121 determines whether or not to erase invalid blocks of the nonvolatile memory 117 based on a data write start address and a data size sent from the access unit 100, and simultaneously performs writing of data and erasing when performing erase of the invalid blocks. The nonvolatile memory access section 123 performs writing, reading, and erasing of data by the memory controller 116 directly accessing the nonvolatile memory 117. In addition, all blocks except for the nonvolatile memory 117 in the semiconductor memory card constitute a semiconductor memory control apparatus.

The nonvolatile memory 117 is composed of memory chips A and B of two flash memories and each nonvolatile memory chip has a data capacity of 16 MB, for example. The nonvolatile memory 117, as will be described later, is composed of an address management area and a data area. Two memory chips A and B are connected to the memory controller 116 with independent bidirectional buses.

Further, the host information memory 118 temporarily stores the data write start sector address SA at a sector unit given by the access unit 100 and a write size L at the sector unit.

Figure 2:
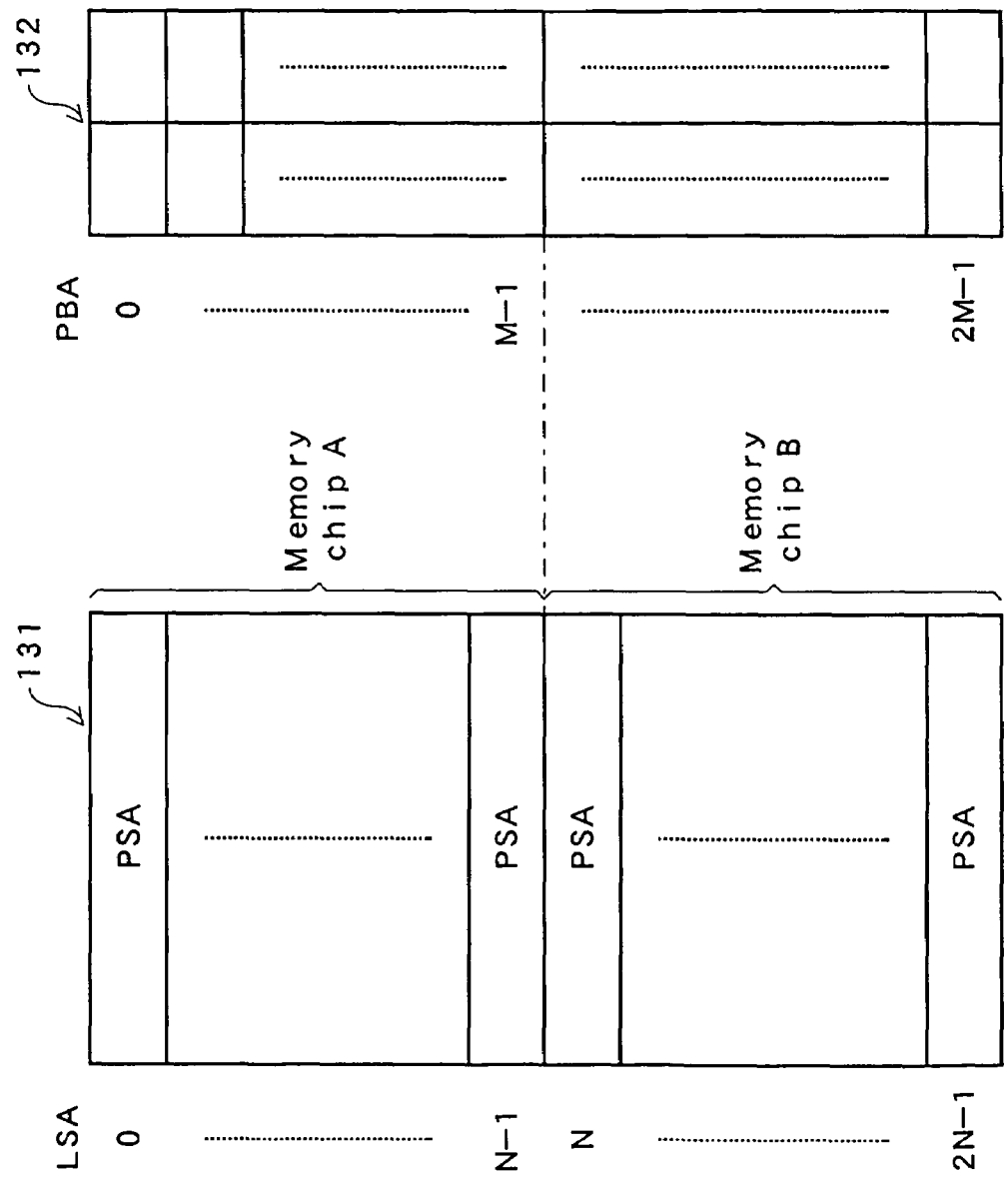
FIG. 2 is an explanatory view showing a table of a logical/physical conversion control section according to Embodiment 1 of the present invention.

FIG. 2 is an explanatory view showing the logical/physical conversion control section 120. The logical/physical conversion control section 120 is composed of the logical/physical conversion table 131 and the entry table 132. The logical/physical conversion table 131 is a table showing conversion from a logical sector address LSA designated by the access unit 100 to a physical sector address PSA. The nonvolatile memory 117 has a space of 2N sectors as a logical space, and logical sector addresses of the memory chip A and memory chip B are logically continuous. In the logical/physical conversion table 131, the first half part, that is, logical sector addresses 0 to N−1, is a table area corresponding to the nonvolatile memory chip A, and the last half part, that is, logical sector addresses N to 2N−1, is a table area corresponding to the nonvolatile memory chip B. In FIG. 2, assumed that each logical sector has a user data area of 512 B, when the memory chips A and B each have a data capacity of 16 MB, the logical sector address N shown in FIG. 2 becomes $2^{15}$. Here, one physical block is formed by 32 sectors. Accordingly, since each physical block has a capacity of 16 KB and this physical block is also a unit which can be selectively erased, it is called an erase block.

The entry table 132 is a table showing states of respective physical blocks of physical block addresses PBA 0 to 2M−1, and each physical block is indicated by 2-bit data. Here, 00 denotes a valid block in which valid data is recorded, 11 denotes an invalid block that data recorded is invalid data, 10 denotes a defective block, and 01 denotes an erased block. In also the entry table 132, the first half part, that is, the physical block addresses 0 to M−1, is a table area corresponding to the nonvolatile memory chip A, and the last half part, that is, the physical block addresses M to 2M−1, is a table area corresponding to the nonvolatile memory chip B. These two tables 131 and 132 are respectively recorded in volatile memories such as RAM.

FIG. 3 is an explanatory view showing a configuration of erase blocks arranged in respective memory chips A and B. One erase block is composed of pan 32 sectors. Each sector area has an area of 528 bytes, which is composed of a data area of 512 bytes for writing so-called user data and a management region (MR) of 16 bytes for writing address management information. The address management information includes a flag or the like which indicates that a corresponding logical address and data stored in the data area are valid, invalid, or a defective block. Then, during initialization immediately after power on, the CPU 113 reads information stored in the management region MR of each erase block of the memory chips A and B to produce the logical/physical conversion table 131 and entry table 132 of FIG. 2 in the RAM in the logical/physical conversion control section 120.

Figure 4:
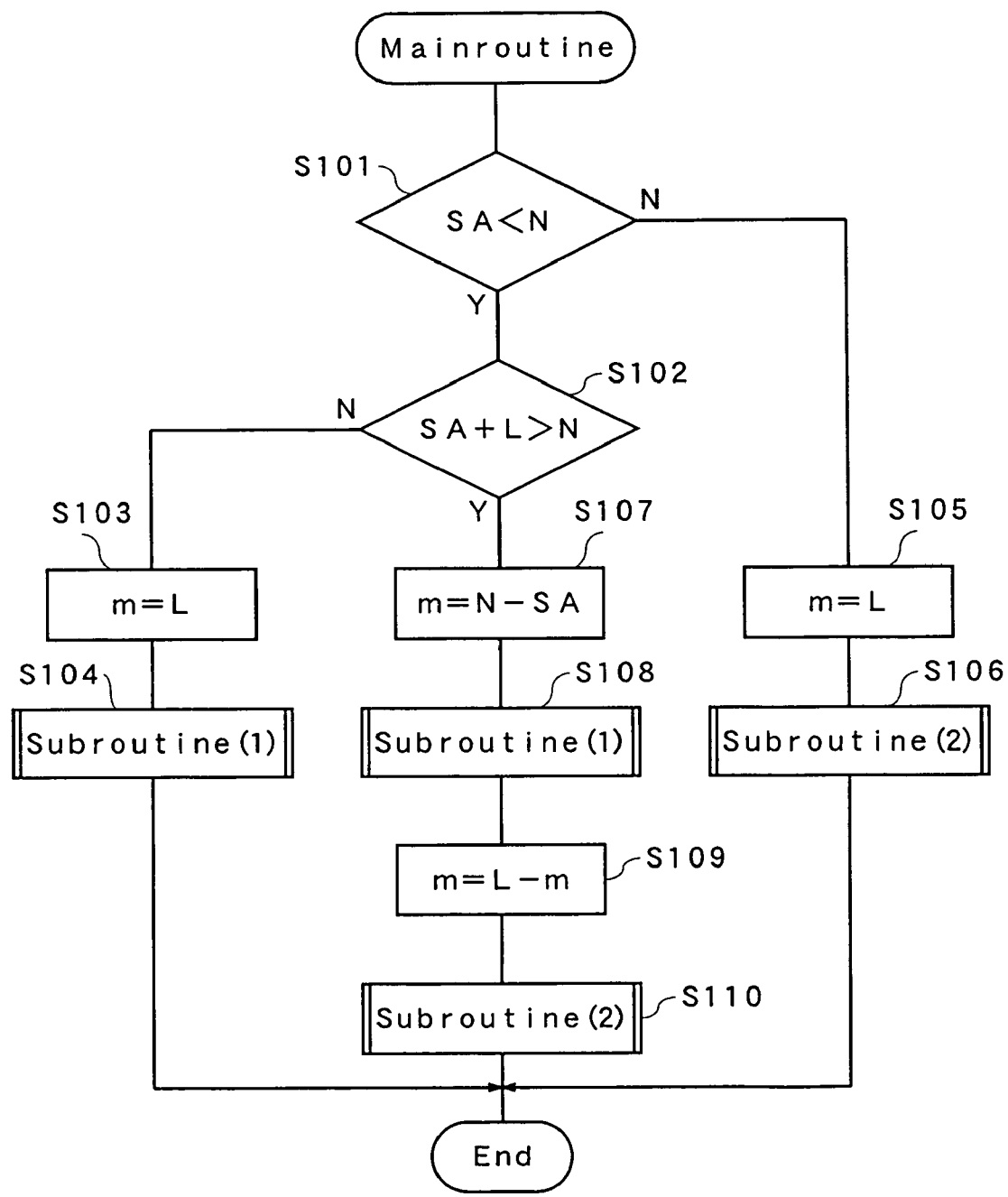
FIG. 4 is a flowchart showing a data write process in the semiconductor memory card according to Embodiment 1 of the present invention.

The operation in writing period of the thus-configured semiconductor memory card will be described by using flowcharts of FIGS. 4 to 6 and time charts of FIGS. 7 and 8. When writing, the access unit 100 first transfers the data write start sector address SA and the write size L to the semiconductor memory card 111 in addition to a write command. The start sector address SA and the write size L are temporarily stored in the host information memory 118. The memory controller 116, based on the start sector address SA and the write size L temporarily stored in the host information memory 118 and parameters (sector address N) being indicative of interface between the first half area and second half area of the nonvolatile memory 117, determines whether or not SA is less than N (step S101). Further, if SA is less than N, it is determined whether or not SA+L exceeds N (step S102). Accordingly, it is determined whether or not writing should be performed only in the first half area (memory chip A), only in the last half area (memory chip B), or in both areas.

If writing is performed only in the first half area, the processing goes to step S103 to set a pointer m to L. The pointer m denotes a write size in each memory chip. Then, the processing of subroutine (1) is performed (step S104), and then, completed. Further, in step S101, if N is not less than SA, writing is performed only in the last half area, therefore the pointer m is set to L in step S105 and the processing of subroutine (2) is performed in step S106 (step S106), and then, completed. In addition, if writing is performed from the first half area to the last half area, that is, if writing is performed in two memory chips A and B, the pointer m is set to N-SA in step S107 to perform write processing in the memory chip A by the subroutine (1) (step S108). After that, in step 109, the pointer m is set to L-m to perform write processing in the memory chip B by the subroutine (2) in step S110 (step S111).

Figure 5:
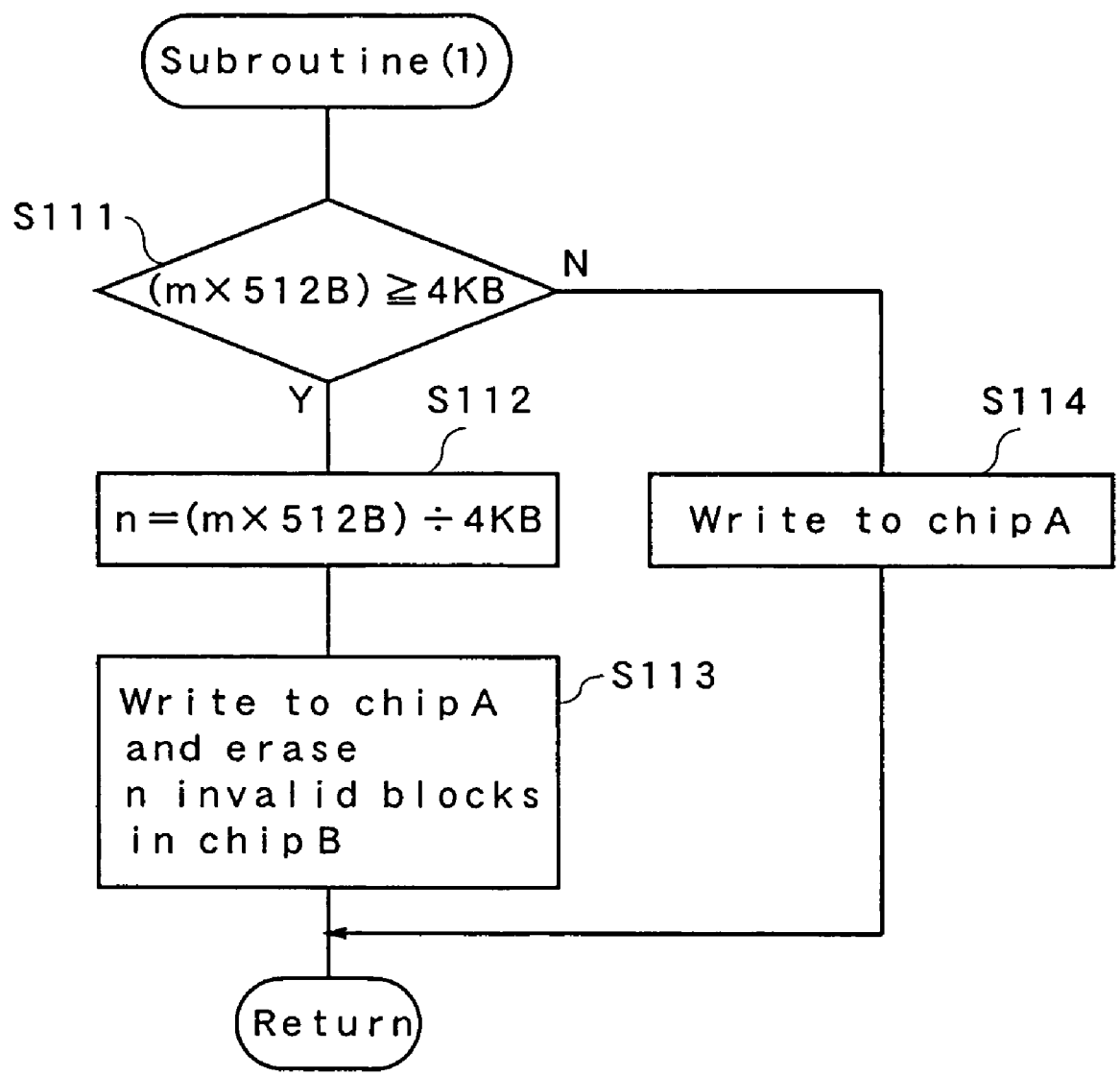
FIG. 5 is a flowchart showing processing of subroutine (1) according to Embodiment 1 of the present invention.

FIG. 5 is a flowchart showing processing of the subroutine (1). In this flowchart, when the operation is started, it is first checked whether or not m×512 B exceeds 4 KB in step S111. In Embodiment 1, a write time of 2 mSec is needed when the write data size is 4 KB. The free physical area generation section 121 determines, whether or not a memory chip (here, the memory chip B) other than a memory chip to be written is erased, by a write data size that is 8 times a 512 B unit, that is, not less than 4 KB or not. An erase command is issued when performing erase. If this value exceeds 4 KB in step S111, calculation of (m×512 B)/4 KB is performed in step S112. Here, n is set as an integer number of the quotient. Then, the processing goes to step S113 to write data, which is sent to a free block of the memory chip A, with address management information. Further, n invalid blocks of the memory chip B are simultaneously erased. It is determined whether or not they are invalid blocks depending on whether or not 11 is recorded in the entry table 132. After performing erase, the entry table is updated as 01, that is, an erased block, for the block. All invalid blocks are erased if the number of invalid blocks is not more than n, and erasing is not needed if there are no invalid blocks. Further, if the write data size is less than 4 KB in step S111, writing is performed only in a free block of the memory chip A to complete the processing.

Figure 6:
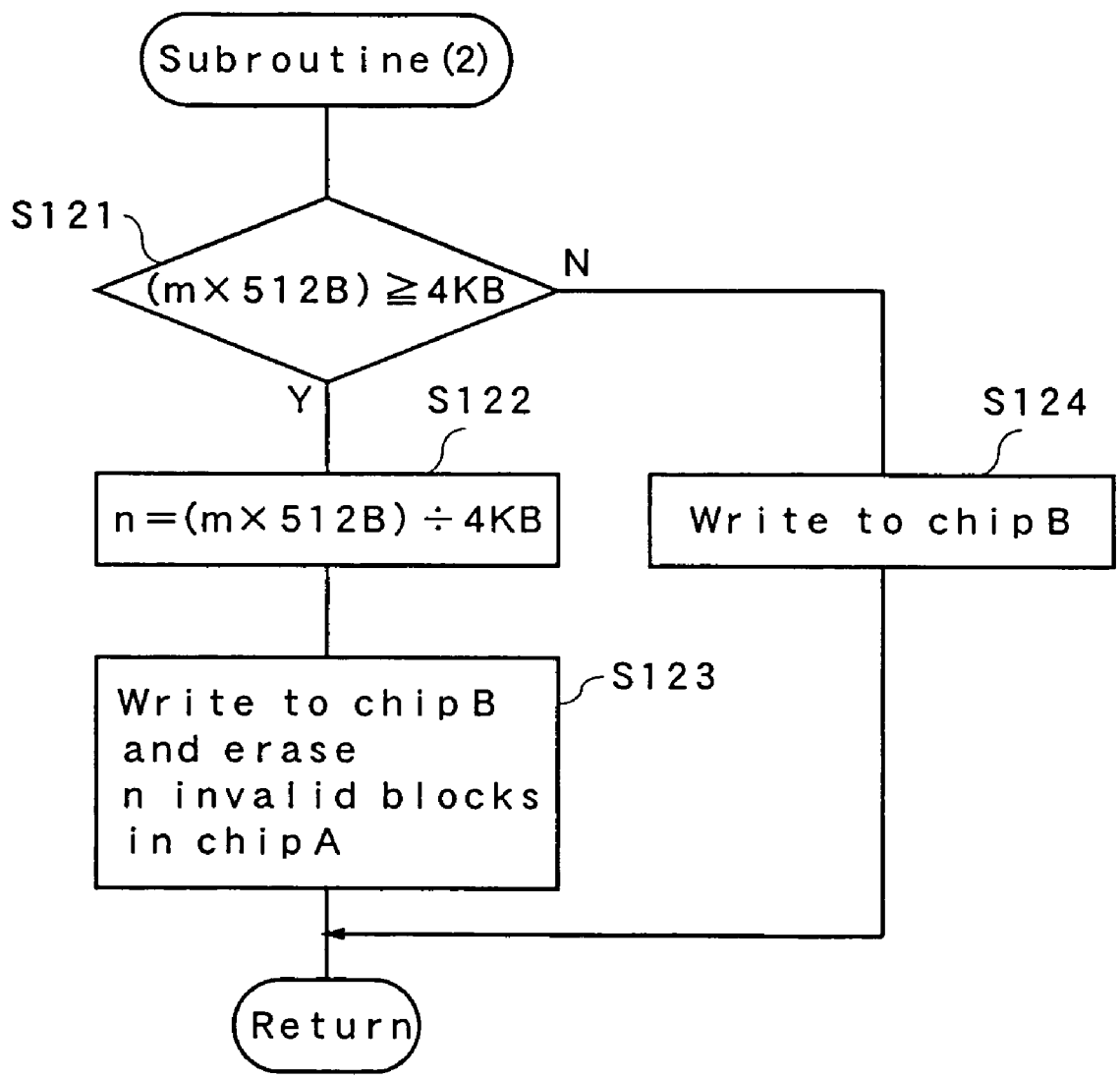
FIG. 6 is a flowchart showing processing of subroutine (2) according to Embodiment 1 of the present invention.

Next, FIG. 6 is a flowchart showing the subroutine (2). In this flowchart, when the operation is started, it is first checked whether or not m×512 B exceeds 4 KB in step S121. In Embodiment 1, an example which a write time of 2 mSec is needed when the write data size is 4 KB is shown, and the free physical area generation section 121 determines, whether or not a memory chip (here, the memory chip A) other than a memory chip to be written is erased, by a write data size that is 8 times a 512 B unit, that is, not less than 4 KB or not. An erase command is issued when performing erase. If this value exceeds 4 KB in step S121, calculation of (m×512 B)/4 KB is performed in step S122. Here, n is set as an integer number of the quotient. Then, the processing goes to step S123 to write data, which is sent to a free block of the memory chip B, with address management information. Further, n invalid blocks of the memory chip A are simultaneously erased. It is determined whether or not they are invalid blocks depending on whether or not 11 is recorded in the entry table 132. After performing erase, the entry table is updated as 01, that is, an erased block, for the block. All invalid blocks are erased if the number of invalid blocks is not more than n, and erasing is not needed if there are no invalid blocks. Further, if the write data size is not more than 4 KB in step S121, writing is performed only in a free block of the memory chip B to complete the processing.

Next, writing in the memory chip A and erase processing in the memory chip B in step S113 will be described by using a time chart. FIG. 7 shows a time chart when the write size is 4 KB in the case of writing only in the first half area (memory chip A). The upper part of FIG. 7 shows access to the memory chip A. An issue period of a write command WC is a period for transferring write instruction to the nonvolatile memory chip A and an address to be written. A data transfer (DATA) period is a period for transferring write data to the memory chip A. Further, a program busy period (BUSY) is a period for actually writing write data in the memory chip A. Actually, a write command is issued by the nonvolatile memory access section 123. After that, in transferring data, write data of 512 B for one sector and data of 16 B for a management area corresponding to the write data, that is, a data transfer of 528 B is performed. This period is approximately 50 μs. A busy flag (BUSY) is then flagged at write time. This period is approximately 200 μs. When writing (W1) in the first sector is completed in this way, writing by similar processing is repeated in the next sector. By writing data for 8 sectors in this way, one physical block, that is, data for 4 KB can be written. The data write time required for this 4 KB is 250×8 (μs), that is, approximately 2 ms.

On the other hand, in synchronization with this, erase processing requiring almost the same time is performed in the memory chip B. A block to be erased in the memory chip B is a physical block shown as an invalid block (11 in binary) in the entry table 132. An erase command EC is issued to this physical block. By doing this, an erase busy signal (BUSY) can be obtained in the erase period, and erasing can be performed during this time.

Here, when a NAND type flash memory or the like is used as the nonvolatile memory, the erase busy time is longer (for example, 2 mSec) compared to the program busy time (200 μs).

By the above-mentioned processing, when a write size in the memory chip A is not less than 4 KB, writing process is simultaneously performed with erasing in the memory chip B, thereby permitting the entire processing performance to be rationalized because of not exposing an erase time. By further calculating the number of erase blocks corresponding to the write size L, processing performance is not degraded and as many as possible of sectors can be erased.

Figure 7:
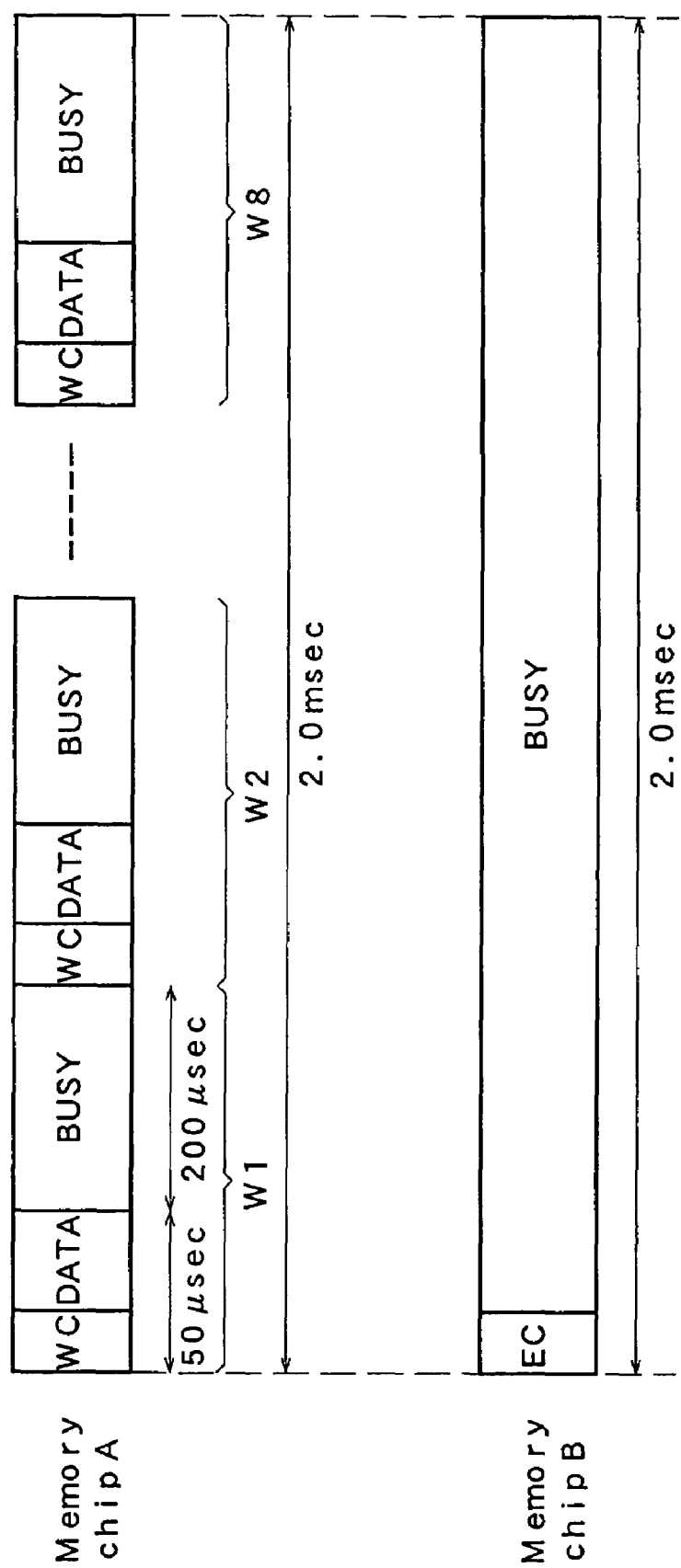
FIG. 7 is a time chart showing writing of data and an erase process of the erase blocks according to Embodiment 1 of the present invention.
Figure 8:
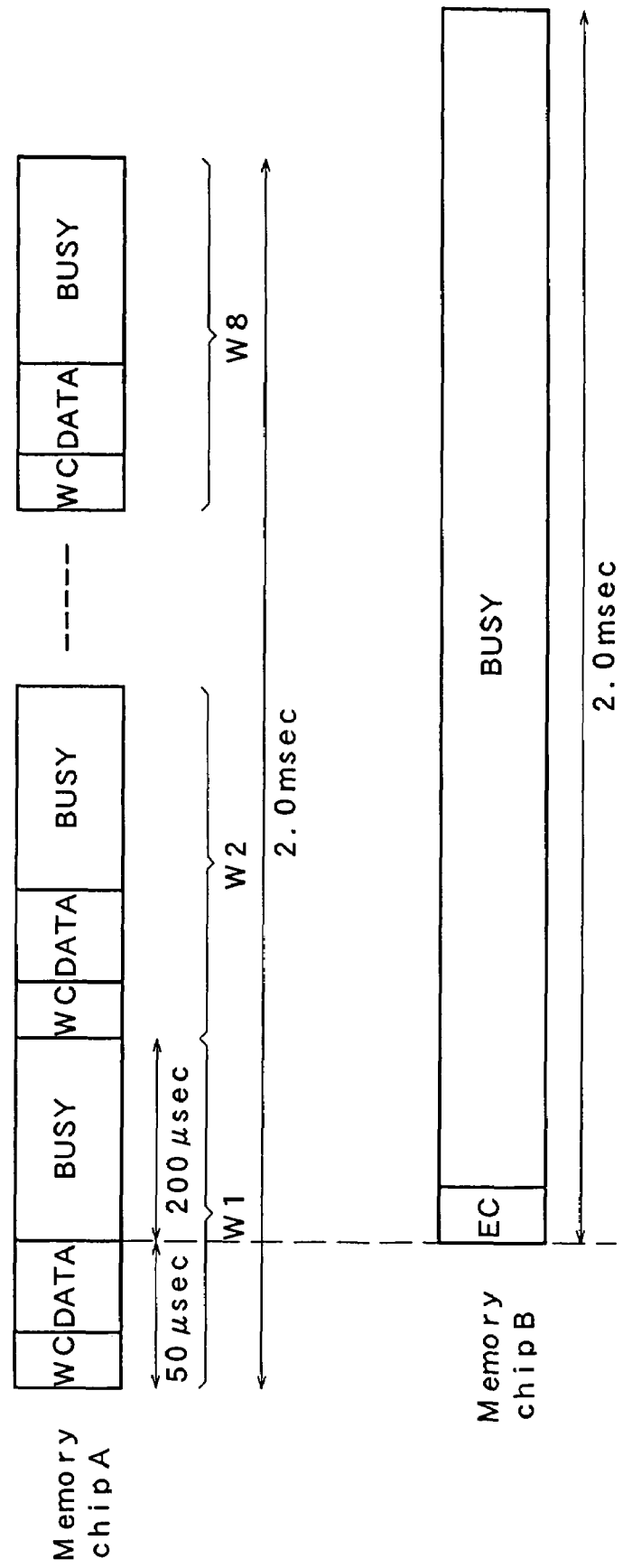
FIG. 8 is a time chart showing a write process and an erase process in a memory chip when a memory controller and a nonvolatile memory have a common bus according to Embodiment 1 of the present invention.

Further, FIG. 7 shows an example in which writing in the memory chip A and erasing in the memory chip B are simultaneously performed; however, as shown in step S123 of a flowchart in FIG. 6, in the case of writing in the memory chip B and erasing in the memory chip A, the same operations are performed although the memory chips A and B are merely reversed. In addition, in the case of writing in both memory chips A and B, these processing are sequentially performed.

Further, in this embodiment, the memory chips A and B of the nonvolatile memory 117 are connected to the memory controller 116 with independent buses, but they may be commonly connected with one bus. In that case, however, the free physical area generation section 121 staggers issuing timing between the write command WC and the data transfer period, and the erase command temporarily so that bus conflict does not occur between the write command and the erase command of FIG. 7. That is, as shown in FIG. 8, the erase command EC is issued after the write command issue period WC using a bus and the data transfer period (DATA). Then, if the BUSY state is completed after issuing the erase command, the write command of the next sector and data transfer following this write command are performed. This enables a plurality of memory chips and the memory controller to be commonly connected with one bus.

Further, in this embodiment, in the case of requiring a write time which corresponds to the erase time of the erase block, erasing and writing are performed in parallel. Values shown here are one example and these values can be appropriately selected according to the write time and the erase time.

In addition, the logical/physical conversion table shown in FIG. 2 may be a conversion table for converting at a block unit. Further, it may be converted at a unit which a plurality of erase blocks serves as a group. Furthermore, in this embodiment, two memory chips are used as the nonvolatile memory; however, it may be constituted by using a plurality of any memory chip.

Embodiment 2

Figure 9:
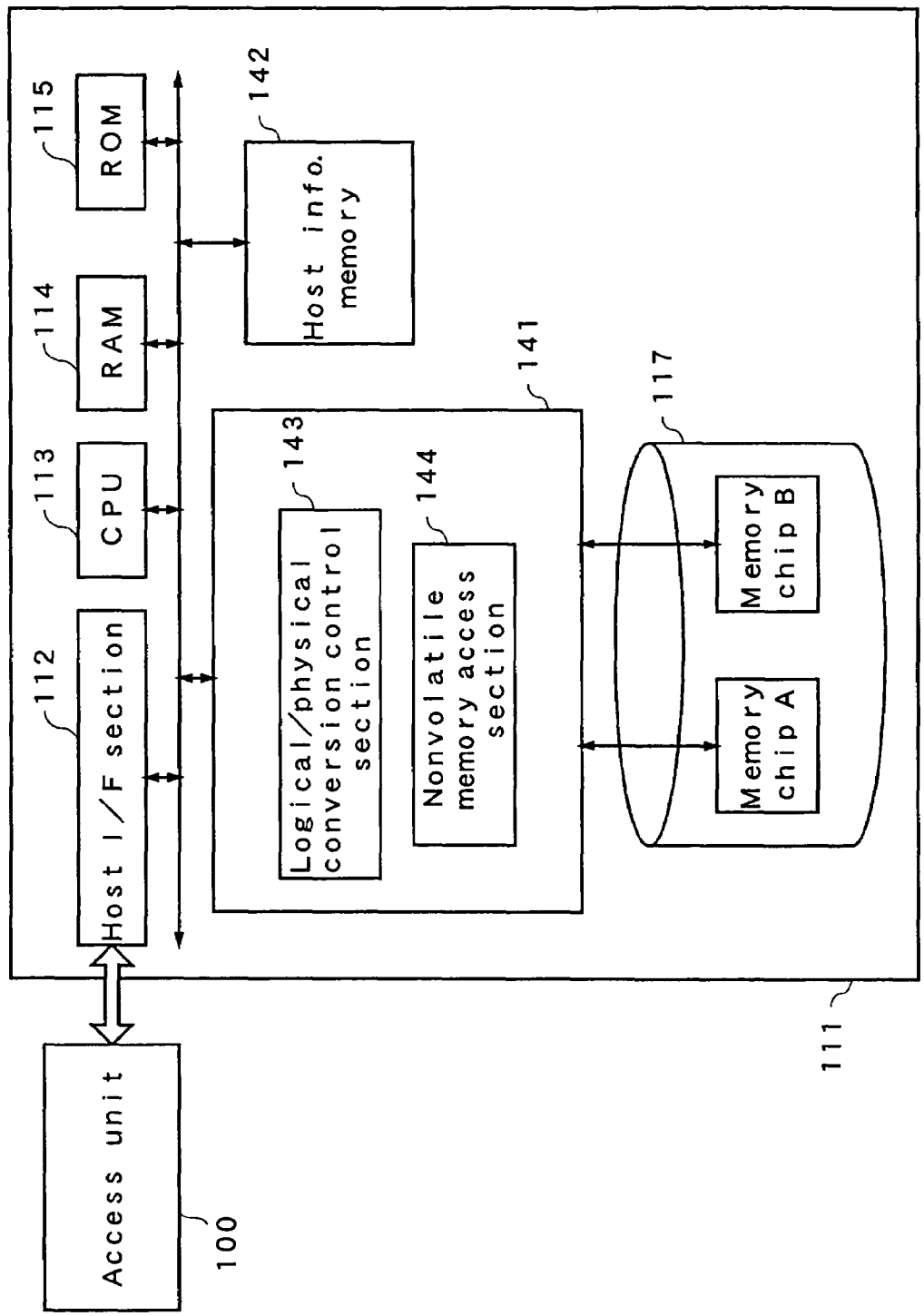
FIG. 9 is an explanatory diagram showing a semiconductor memory card and an access unit according to Embodiment 2 of the present invention.

FIG. 9 is a block diagram showing a semiconductor memory card according to Embodiment 2 of the present invention. In this figure, an access unit 100 is connected to a semiconductor memory card 111. The semiconductor memory card 111 includes a host interface (I/F) section 112, a CPU 113, a RAM 114, a ROM 115, a memory controller 141, a nonvolatile memory 117, and a host information memory 142. The host interface section 112 is an interface for sending/receiving control signals and data to/from the access unit 100. The ROM 115 stores a program for controlling the semiconductor memory card 111. The program runs on the CPU 113 using the RAM 114 as a temporary storage area. The memory controller 116 is an element for controlling the nonvolatile memory 117. The nonvolatile memory 117 is a data storage area in the semiconductor memory card 111. The memory controller 141 includes a logical/physical conversion control section 143 and a nonvolatile memory access section 144. The logical/physical conversion control section 143 includes a logical/physical conversion table and an entry table. The nonvolatile memory access section 144 performs writing, reading, and erasing of data by directly accessing the nonvolatile memory 117 from the memory controller 141.

The nonvolatile memory 117 is composed of memory chips A and B of two flash memories and each nonvolatile memory chip has a data capacity of 16 MB, for example. The nonvolatile memory 117, as will be described later, is composed of an address management area and a data area. Two memory chips A and B are connected to the memory controller 141 with independent bidirectional buses No. 0 and No. 1

The host information memory 142 stores an access speed transferred by the access unit 100, and either state of a high speed mode or a low speed mode is stored. When the high speed mode is set, since the nonvolatile memory access section 144 permits access with a large peak current, access at high speed is performed upon accessing the nonvolatile memory 117. Further, when the low speed mode is set, upon accessing the nonvolatile memory 117, it is controlled so that the load on the power supply is alleviated by decreasing the peak current.

Figure 10:
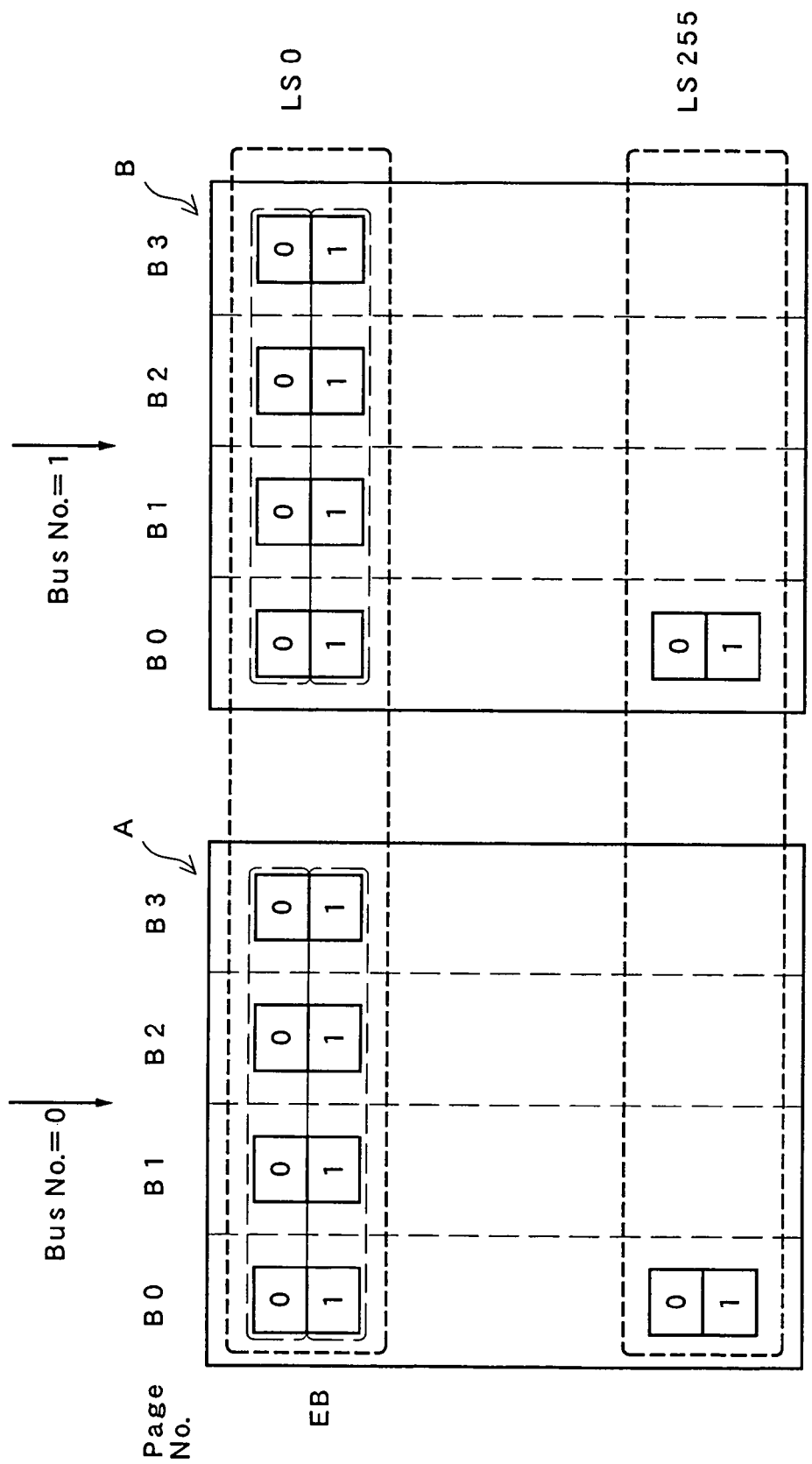
FIG. 10 is an explanatory view showing a configuration of a nonvolatile memory according to Embodiment 2 of the present invention.

FIG. 10 is an explanatory diagram showing an internal configuration of memory chips A and B. Each of the memory chips A and B in the nonvolatile memory 117 is respectively divided into four banks, bank B0 to bank B3. Bank B0 to bank B3 perform writing simultaneously at each page unit. Each erase block EB (4 KB=4224 B) is composed of two pages, that is, page 0 and page 1. All eight erase blocks composed by each one erase block in every bank of the memory chips A and B constitute as a logical section LS. The entire nonvolatile memory 117 is composed by 256 sections, LS0 to LS255.

Figure 11:
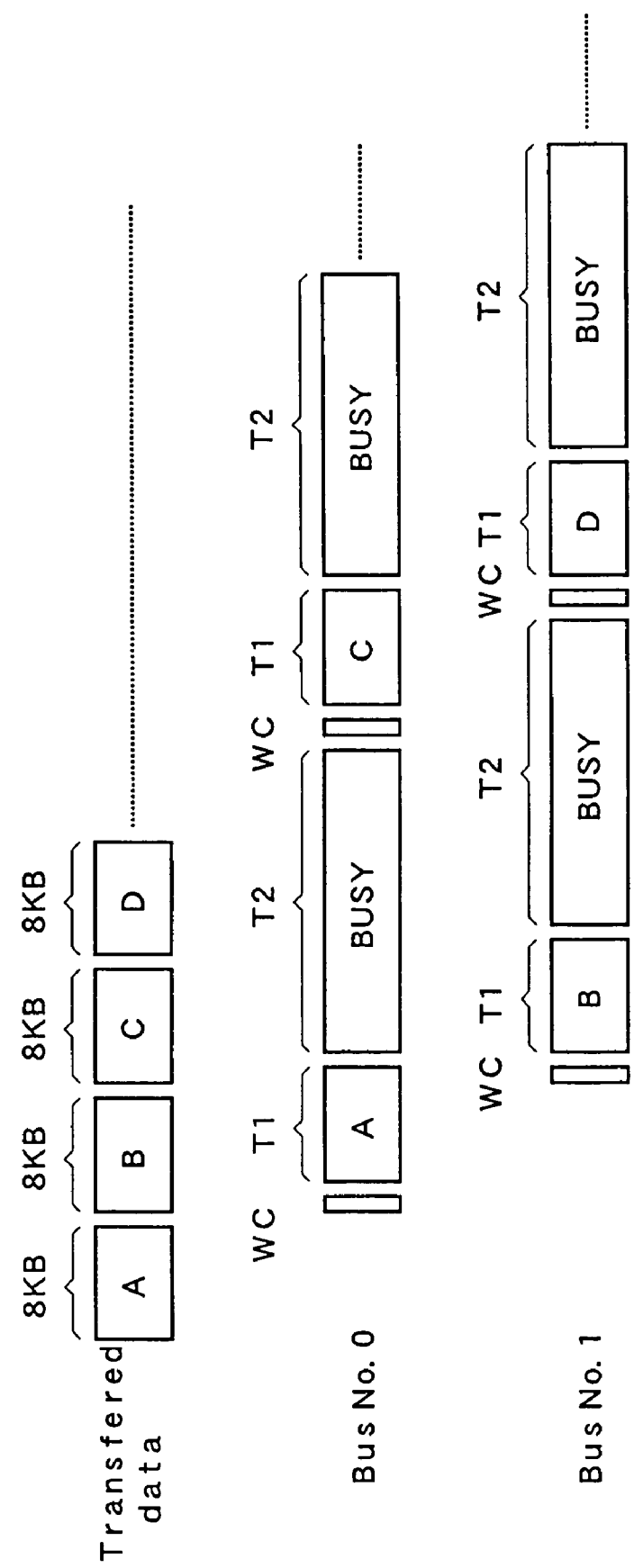
FIG. 11 is a time chart showing a write process at a high speed mode according to Embodiment 2 of the present invention.

The operation of the semiconductor memory card and the access unit as configured above will be described with reference to mainly FIGS. 10 and 11. First, when initializing after powering on the access unit 100, or when switching on the access unit 100, the speed mode is transferred to be stored in the host information memory 142. The nonvolatile memory access section 144 determines an access mode with reference to the speed mode stored in the host information memory 142.

Next, the case of the high speed mode will be described by using FIG. 11. When writing at the high speed mode is performed, write data A, B, C, D, . . . are continuously transferred from the access unit 100 via the host interface section 112 as shown in FIG. 11. Here, logical addresses of the write data are continuous addresses. The thus-transferred dada are first stored in buffer. The addresses are converted to physical addresses by the logical/physical conversion control section 143. The data and addresses are written in the memory chip A via the bus No. 0. Here, WC denotes a write command. Further, T1 denotes a data transfer period and T2 denotes a program busy time in which write processing in the memory chip A is actually performed. When data transfer of the bus No. 0 is completed, followed by the write command to the bus No. 1, data transfer of the data B is subsequently performed in the period of T1. Writing of the data is performed in the memory chip B in the period of T2. During the writing, when write processing is completed in the memory chip A, write command, data transfer of the data C, and writing are performed from the bus No. 0. Further, writing in the memory chip B is completed, transfer of write command and the data D, and data writing processing are performed. As describe above, the write time of the data A and C and the write time of the data B and D are overlapped as shown in FIG. 11, but writing processing with high speed is performed by writing in parallel.

Figure 12:
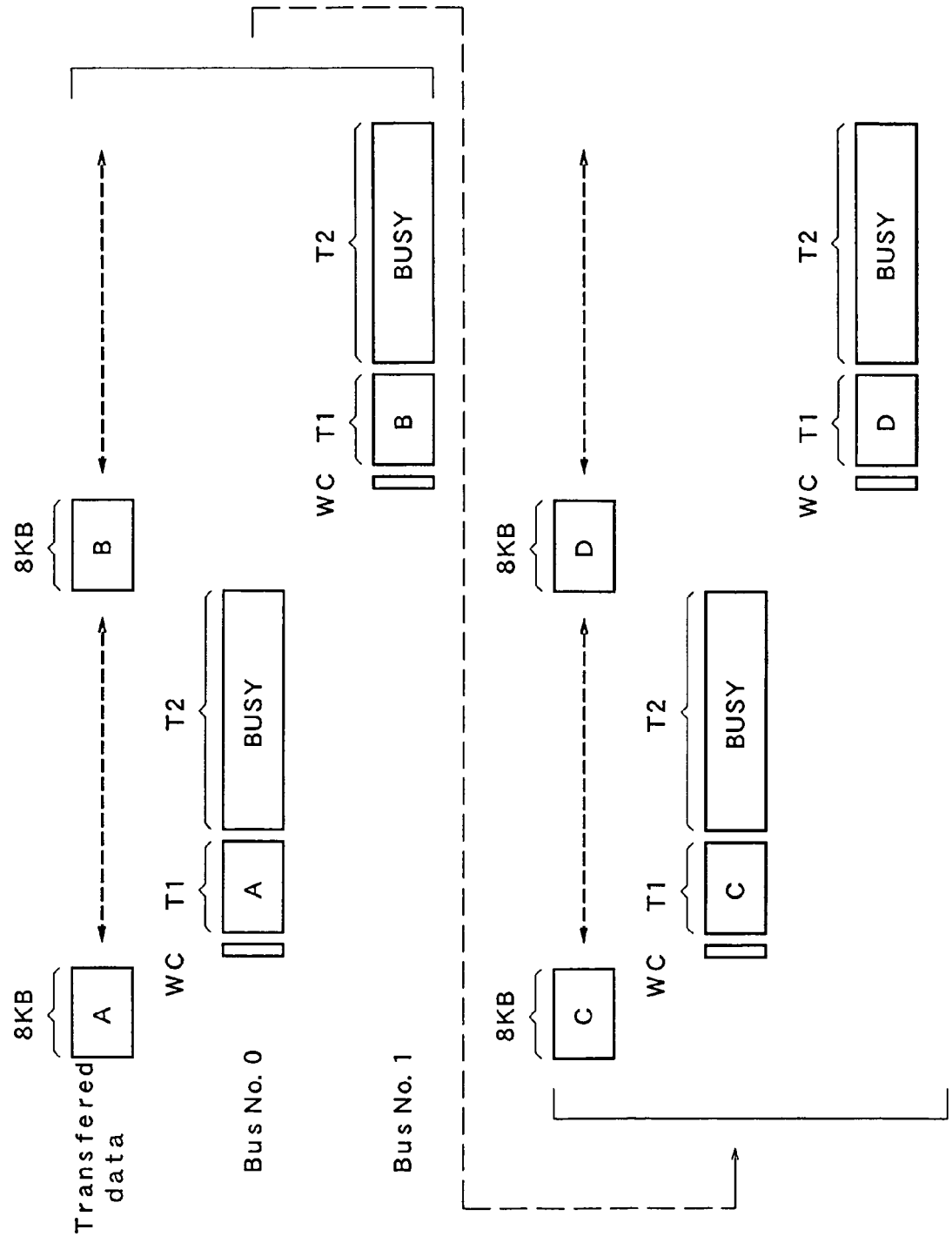
FIG. 12 is a time chart showing a write process at a low speed mode according to Embodiment 2 of the present invention.

On the other hand, the case that the speed mode set for the host information memory 142 is a low speed mode will be described by using FIG. 12. An actual write period of write data A, B, C, D, . . . , that is, a program busy period is a period that consumes much current compared to data transfer. In the low speed mode, writing is controlled so that the program busy time is not overlapped temporally. More specifically, the write command WC is issued for the bus No. 0, and if the data A is transferred, writing in the memory chip A is performed to become the program busy (BUSY) during this period. The nonvolatile memory access section 144 feedbacks a card busy signal to the access unit 100 to stop data transfer until the write processing is completed and release of the program busy signal (BUSY) of the memory chip A to be written is informed to the nonvolatile memory access section 144. After that, when the stop is released, the data B is subsequently transferred from the access unit 100. After this, the write command WC is issued to the bus No. 1 to perform data transfer of the data B. Consequently, it becomes the program busy (BUSY) when writing by the memory chip. During this time, the data transfer is stopped by the access unit 100. If the writing is completed, the next data C is transferred to repeat the same processing. By such a bidirectional control, program busy period which consumes much current is dispersed to suppress the peak current.

Consequently, when the access unit 100 in which withstanding current value of a power supply circuit is low is used, the access unit 100 sets the host information memory 142 to be the low speed mode in order to select the low speed mode. On the other hand, when high speed access is required in the case of using the access unit 100 in which withstanding current value of the power supply circuit is high, the access unit 100 sets host information memory 142 to be the high speed mode. The nonvolatile memory access section 144 selects the access mode shown in FIG. 11 or 12 to perform writing control corresponding to each mode.

Further, this embodiment switches between the high speed mode which permits overlap of data write and the low speed mode which does not permit the overlap by using two memory chips A and B. In the case of many further memory chips, four memory chips, for example, it may be switched between the low speed mode which permits overlapped writing of two memory chips and the high speed mode which can simultaneously perform writing in all memory chips. Further, only writing in either memory chip may be permitted at low speed mode, and overlapped writing in two or more memory chips may be permitted at high speed mode.

The semiconductor memory card according to this embodiment is a semiconductor memory card used by being connected to an access unit, comprises:

a host interface section which sends a control signal and data to the access unit and receives a signal from the access unit;

a nonvolatile memory which includes a plurality of nonvolatile memory chips and in which a plurality of continuous sectors is grouped to be a block as a minimum unit of data erasing;

a memory controller which is connected to each of the plurality of nonvolatile memory chips with respectively independent bidirectional buses and controls erasing, writing, and reading of data; and a host information memory which temporarily stores a write speed mode given by the access unit, wherein the memory controller includes a nonvolatile memory access section which performs writing with respect to the plurality of nonvolatile memory chips with controlling write timing to each of the plurality of nonvolatile memories depending on a speed mode stored in the host information memory.

Here, writing is performed in parallel with respect to the plurality of nonvolatile memory chips when the write speed mode stored in the host information memory is a high speed mode, and writing is sequentially performed with respect to the plurality of nonvolatile memory chips when the write speed mode stored in the host information memory is a low speed mode.

Further, the semiconductor memory control method according to this embodiment is a semiconductor memory control method in a semiconductor memory card having a nonvolatile memory which includes a plurality of nonvolatile memory chips and in which a plurality of continuous sectors is grouped to be a block as a minimum unit of data erasing, the method including the step of:

performing writing with respect to the plurality of nonvolatile memory chips with controlling write timing to each of the plurality of nonvolatile memories depending on the speed mode stored in the host information memory.

Embodiment 3

Figure 13:
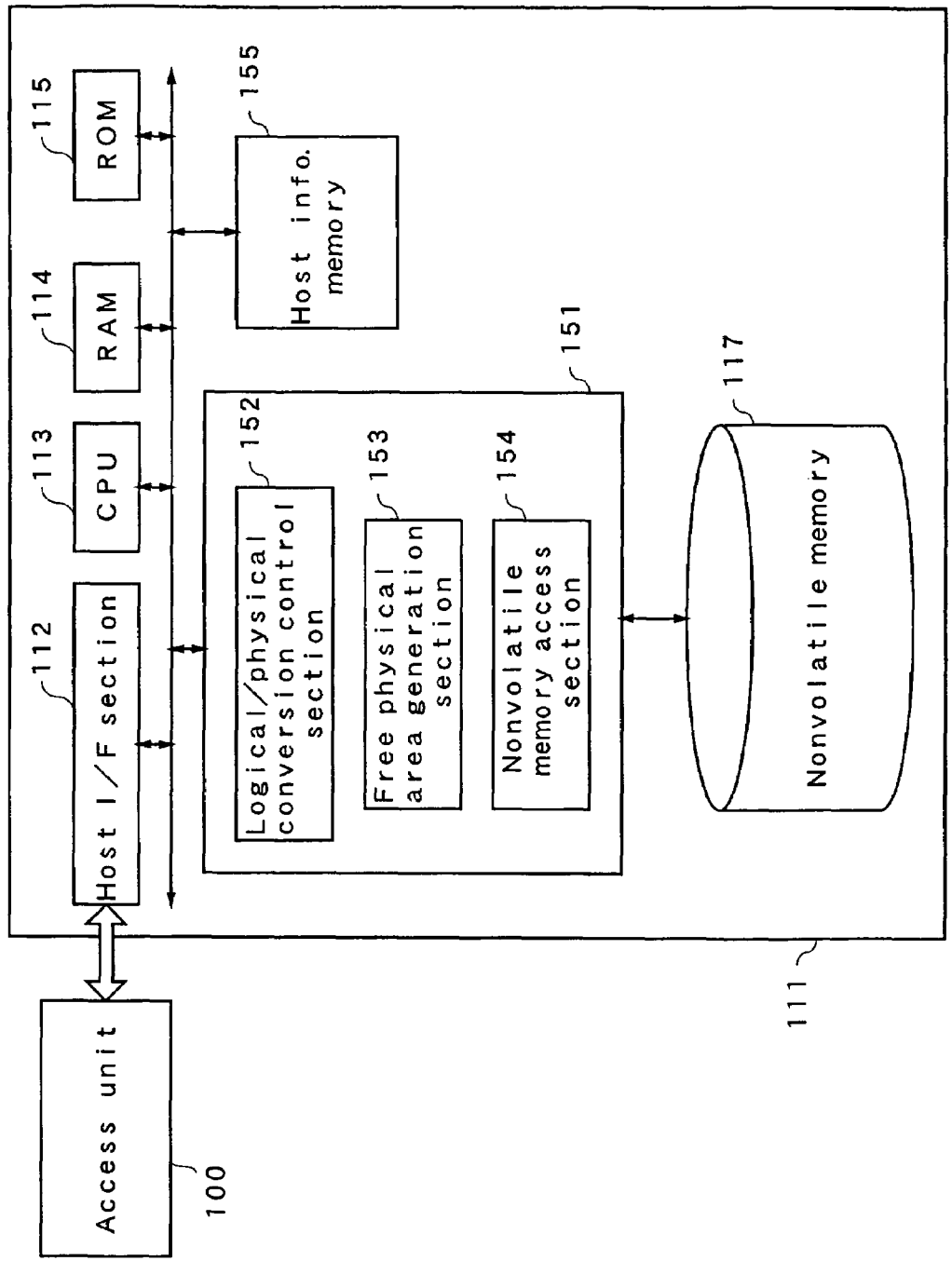
FIG. 13 is an explanatory diagram showing a semiconductor memory card and an access unit according to Embodiment 3 of the present invention.

Next, Embodiment 3 of the present invention will be described. FIG. 13 is a block diagram showing a semiconductor memory card according to this embodiment. In FIG. 13, an access unit 100 is connected to a semiconductor memory card 111. The semiconductor memory card 111 includes a host interface (I/F) section 112, a CPU 113, a RAM 114, a ROM 115, a memory controller 151, a nonvolatile memory 117, and a host information memory 155. The host interface section 112 is an interface for sending/receiving control signals and data to/from the access unit 100. The ROM 115 stores a program for controlling the semiconductor memory card 111. The program runs on the CPU 113 using the RAM 114 as a temporary storage area. The memory controller 151 is an element for controlling the nonvolatile memory 117. The nonvolatile memory 117 is a data storage area in the semiconductor memory card 111. The memory controller 151 includes a logical/physical conversion control section 152, a free physical area generation section 153, and a nonvolatile memory access section 154. The logical/physical conversion control section 152, as will be described later, includes a logical/physical conversion table 156 and an entry table 157. Further, the free physical area generation section 153 organizes a recorded state in the nonvolatile memory 117 to increase a free block (erased block) and to be in a writable state at any time without erasing before writing. The nonvolatile memory 117 may be one memory chip or may be those using a plurality of nonvolatile memories. In addition, an erase block in the nonvolatile memory 117 is the same as FIG. 3 of Embodiment 1.

Here, at the time that data is written in the sector not less than a predetermined threshold Th1 at each erase block unit, the free physical area generation section 153 sets the erase block as a defragmentation object block to register it in the entry table of the logical/physical conversion control section 152 to be described later. Further, as will be described later, the free block in the entry table is counted and a defragmentation request signal is sent to the access unit 100 when the counted value becomes not more than a predetermined threshold Th2.

Figure 14:
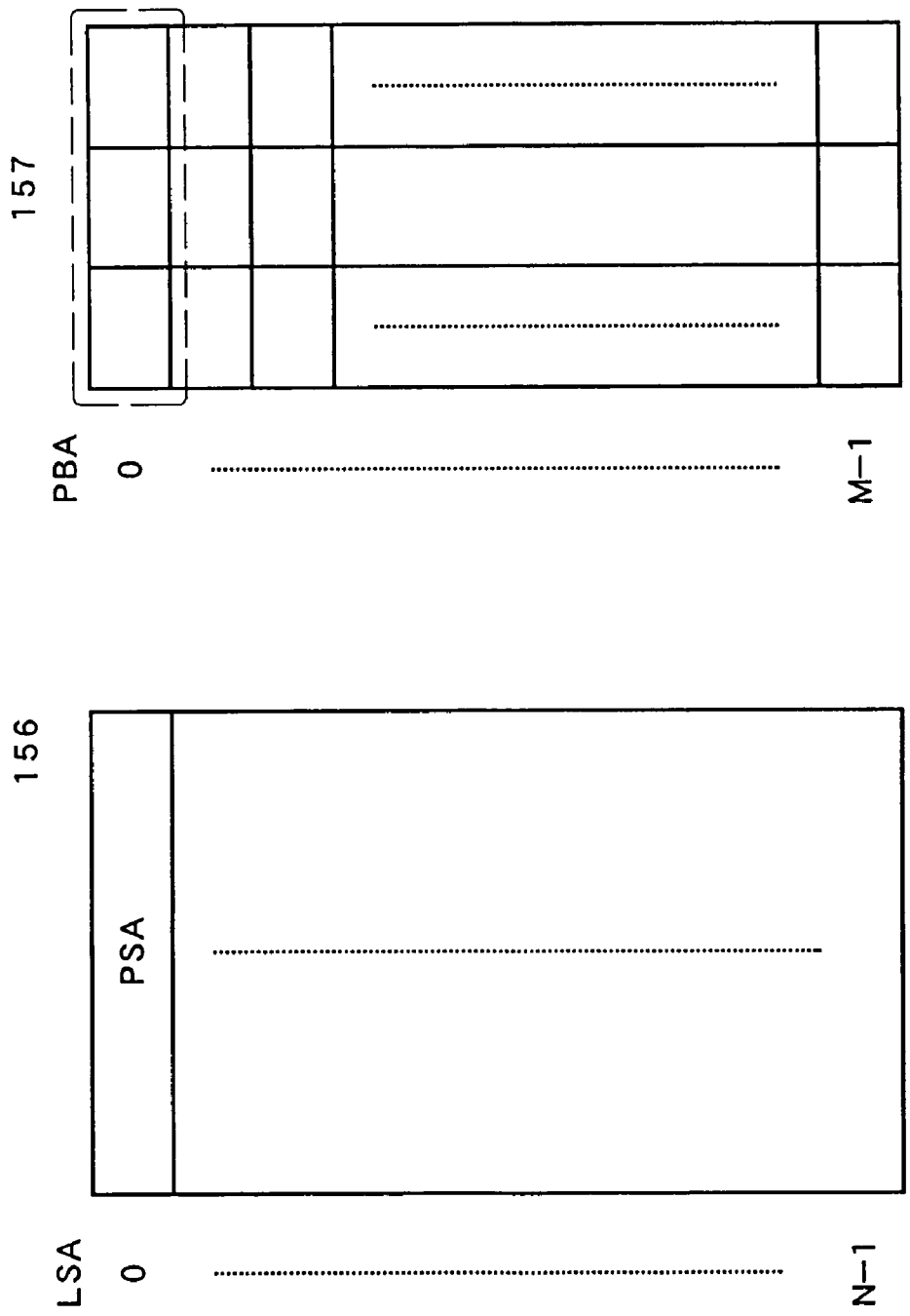
FIG. 14 is an explanatory view showing a table of a logical/physical conversion control section according to Embodiment 3 of the present invention.

FIG. 14 is an explanatory view showing a logical/physical conversion control section 152. The logical/physical conversion control section 152 is a table which manages conversion processing from a logical sector address LSA designated by the access unit 100 to a physical sector address PSA and states of respective physical blocks. The table is composed of the logical/physical conversion table 156 which converts the logical sector address LSA to the physical sector address PSA and the entry table 157. The entry table 157 stores 3-bit information which shows a state of each physical block corresponding to respective block addresses PBA0 to M−1. Here, 000 denotes a valid block, 011 denotes an invalid block, 010 denotes a defective block, 001 denotes a free block, that is, an erased block, and 100 denotes an objective block which defragmentation is to be made. These two tables are stored in a volatile memory such as RAM. During initialization immediately after power on, the CPU 113 reads information stored in the management area of each erase block of the nonvolatile memory 117 to produce the logical/physical conversion table 156 and the entry table 157 on the RAM in the logical/physical conversion control section 152.

Figure 15:
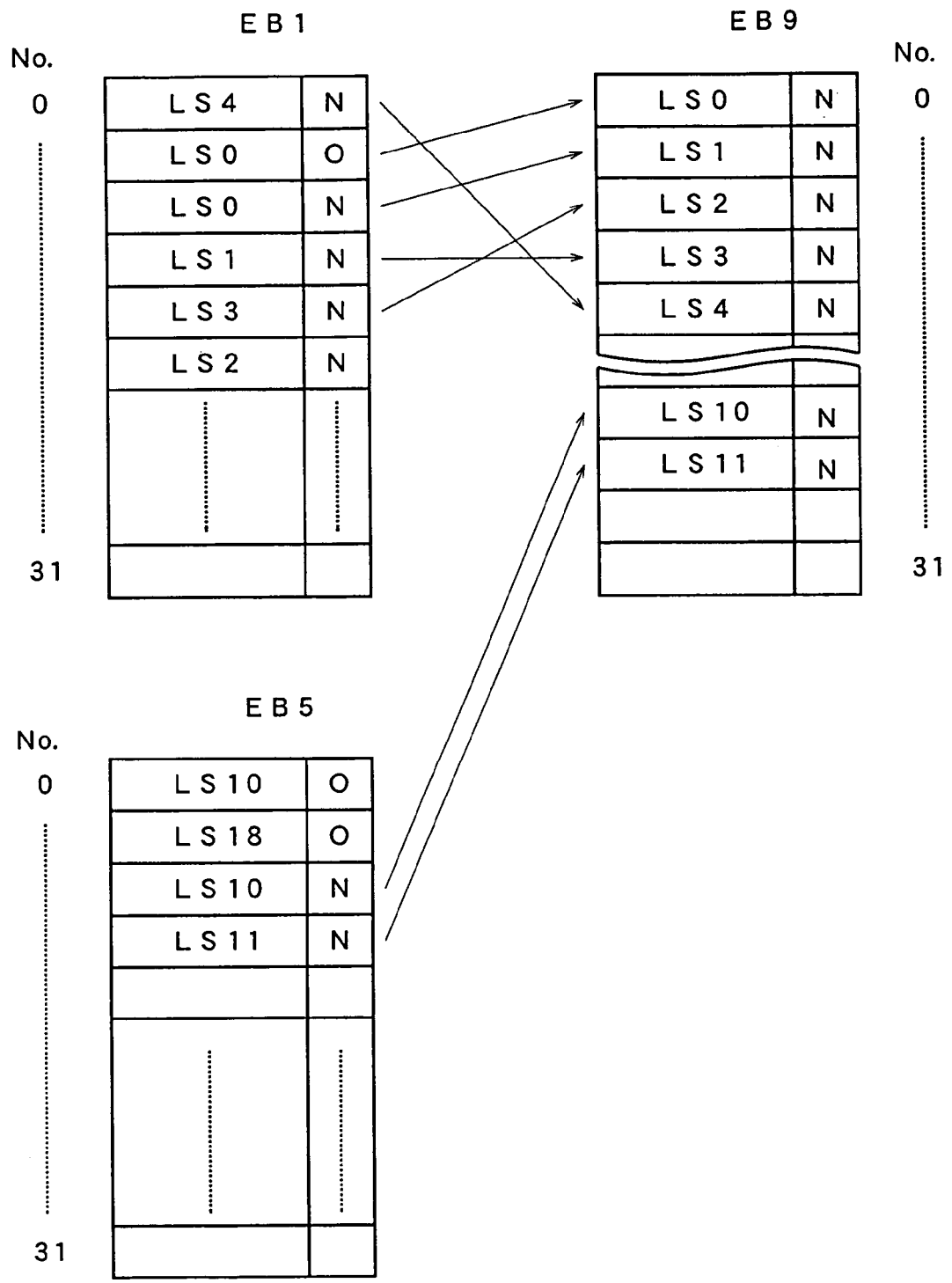
FIG. 15 is an explanatory view showing a defragmentation process according to Embodiment 3 of the present invention.

The operation of the semiconductor memory card and the access unit as configured above will be described with mainly reference to FIGS. 15 and 16. While the access unit 100 performs processing such as writing in the semiconductor memory card, the number of free blocks in the nonvolatile memory 117 gradually decreases. Here, in Embodiment 3, as in Embodiment 2, each sector (page) in the erase block is not written in logical order, but logical sectors transferred by the access unit 100 are written in ascending order of the erase blocks regardless of their logical sector address. More specifically, as shown in FIG. 15, when the access unit 100 issues commands for writing in the logical sectors LS4, LS0, LS0, LS1, LS3, . . . , writing is performed in ascending order at the position of the sector Nos. 0, 1, 2, 3, . . . of the erase block 1. Further, N is a flag showing new flag information, 0 is a flag showing old flag information.

Figure 16:
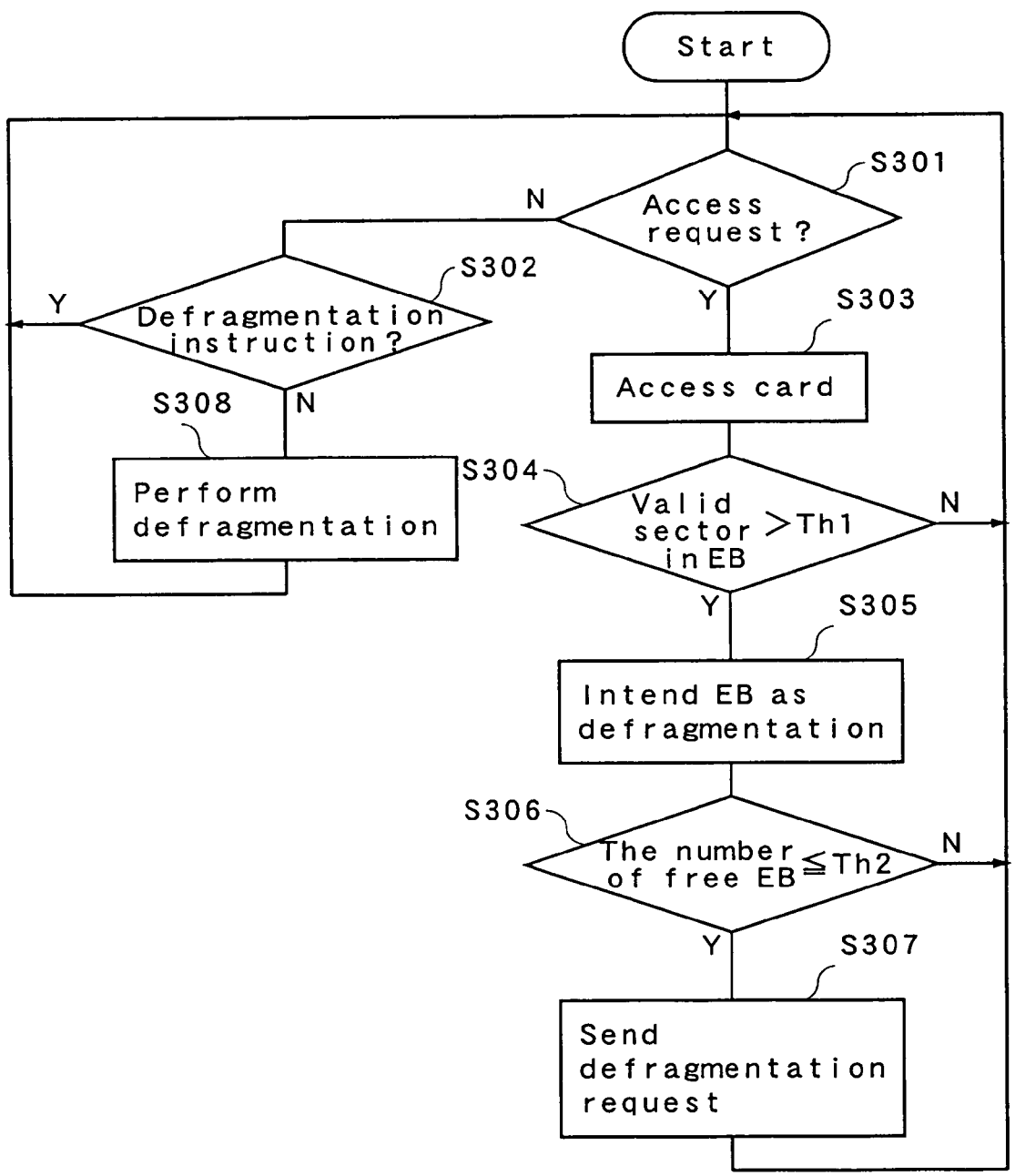
FIG. 16 is a flowchart showing the defragmentation process according to Embodiment 3 of the present invention.

FIG. 16 is a flowchart showing processing of the semiconductor memory card. When the operation starts, it is checked whether or not there is an access request in step S301 first, and if there is no access request, it is checked whether or not there is a defragmentation instruction (step S302). If there is the access request, card access is performed in step S303. Then, it is checked whether or not the valid sector written in step S303 in the erase block of the nonvolatile memory exceeds the threshold Th1. If it is not more than the threshold Th1, similar processing is repeated by getting back to the loop in steps S301 and S302. When the card access is forwarded and at the time that the sector, which exceeds the threshold Th1, is written in the erase block, the free physical area generation section 153 registers the erase block as the defragmentation object block in the entry table 157 of FIG. 14 (step S305). Then, the data of logical sectors, subsequently transferred by the access unit 100, is written searching another free block (erased block) from the entry table 157. By continuing this process, the number of the free blocks in the entry table is gradually decreased, on the contrary, the number of the defragmentation object blocks is increased. The free physical area generation section 153 sets the erase blocks as the defragmentation object blocks in step S305, after that, counts the number of free blocks going to step S306 to check whether or not it is not more than the threshold Th2. If the number of the free blocks exceeds the threshold Th2, similar processing is repeated getting back to the loop in steps S301 and S302. If the number of the free blocks is not more than the threshold, the number of the defragmentation object blocks is ordinarily considered to be many, and therefore, the defragmentation request signal is sent to the access unit 100 going to step S307. Further, in step S306, the number of the defragmentation object blocks may be counted instead of the number of the free blocks. In addition, an access count value may be sent to the access unit 100 in place of the defragmentation request signal in step S307.

Upon receipt of the defragmentation request signal, the access unit 100 may immediately transfer a defragmentation instruction signal to the semiconductor memory card 111. Further, when obtaining the above-mentioned count value, based on the count value, the defragmentation instruction signal may be issued corresponding to subsequently transferring data capacity after assessing a transfer period of the defragmentation instruction signal. When the memory card receives the defragmentation request signal from the access unit, processing goes to step S308 from step S302 to temporarily store the defragmentation instruction signal transferred by the access unit 100 to the host information memory 155. Then, the free physical area generation section 153 refers to this and issues an instruction of defragmentation processing to the nonvolatile memory access section 154.

For example, in FIG. 15, erase blocks EB1 and EB5 serve as the erase blocks registered as the defragmentation object blocks. In this case, instruction of reading/writing is issued to the nonvolatile memory access section 154 so that merge processing is performed in the free erase block 9 in the order of the logical sectors by seeing each sector number (only sector in which a new flag N is marked) of the erase blocks EB1 and EB5. In accordance with the instruction, as shown in FIG. 15, the nonvolatile memory access section 154 copies in the free erase block 9 from the logical sectors in which the new flag N is flagged in the erase blocks EB1 and EB5. After that, the erase blocks EB1 and EB5 are registered in the entry table 157 as invalid blocks. This performs defragmentation according to the instruction by the access unit, whereby defragmentation can be performed, when necessary, without lowering speed compared to the case that the semiconductor memory card performs defragmentation without instruction by the access unit.

Further, the logical/physical conversion table and the entry table may use volatile reading/writing memories other than RAM if they perform access in a comparatively high speed.

Here, the semiconductor memory card according to this embodiment is a semiconductor memory card used by being connected to an access unit. The semiconductor memory card comprises: a host interface section which sends a control signal and data to the access unit and receives a signal from the access unit; a nonvolatile memory which includes a plurality of nonvolatile memory chips and in which a plurality of continuous sectors is grouped to be a block as a minimum unit of data erasing; a memory controller which controls erasing, writing, and reading of data with respect to the nonvolatile memory; and a host information memory which temporarily stores a defragmentation instruction signal given by the access unit. Herein, the memory controller includes a free physical area generation section which detects a remaining amount of erased blocks of the nonvolatile memory, issues a defragmentation request signal to the access unit when the number of erased blocks is a predetermined number or less, and executes defragmentation when the defragmentation instruction signal is temporarily stored in the host information memory.

Further, the semiconductor memory control method according to this embodiment is a semiconductor memory control method in a semiconductor memory card having a nonvolatile memory which includes a plurality of nonvolatile memory chips and in which a plurality of continuous sectors is grouped to be a block as a minimum unit of data erasing. The semiconductor memory control method comprises the steps of: temporarily storing a defragmentation instruction signal given by an access unit in a host information memory; detecting a remaining amount of erased blocks of the nonvolatile memory; issuing a defragmentation request signal to the access unit when the number of erased blocks is a predetermined number or less; and executing defragmentation when the defragmentation instruction signal is temporarily stored in the host information memory.

Embodiment 4

Figure 17:
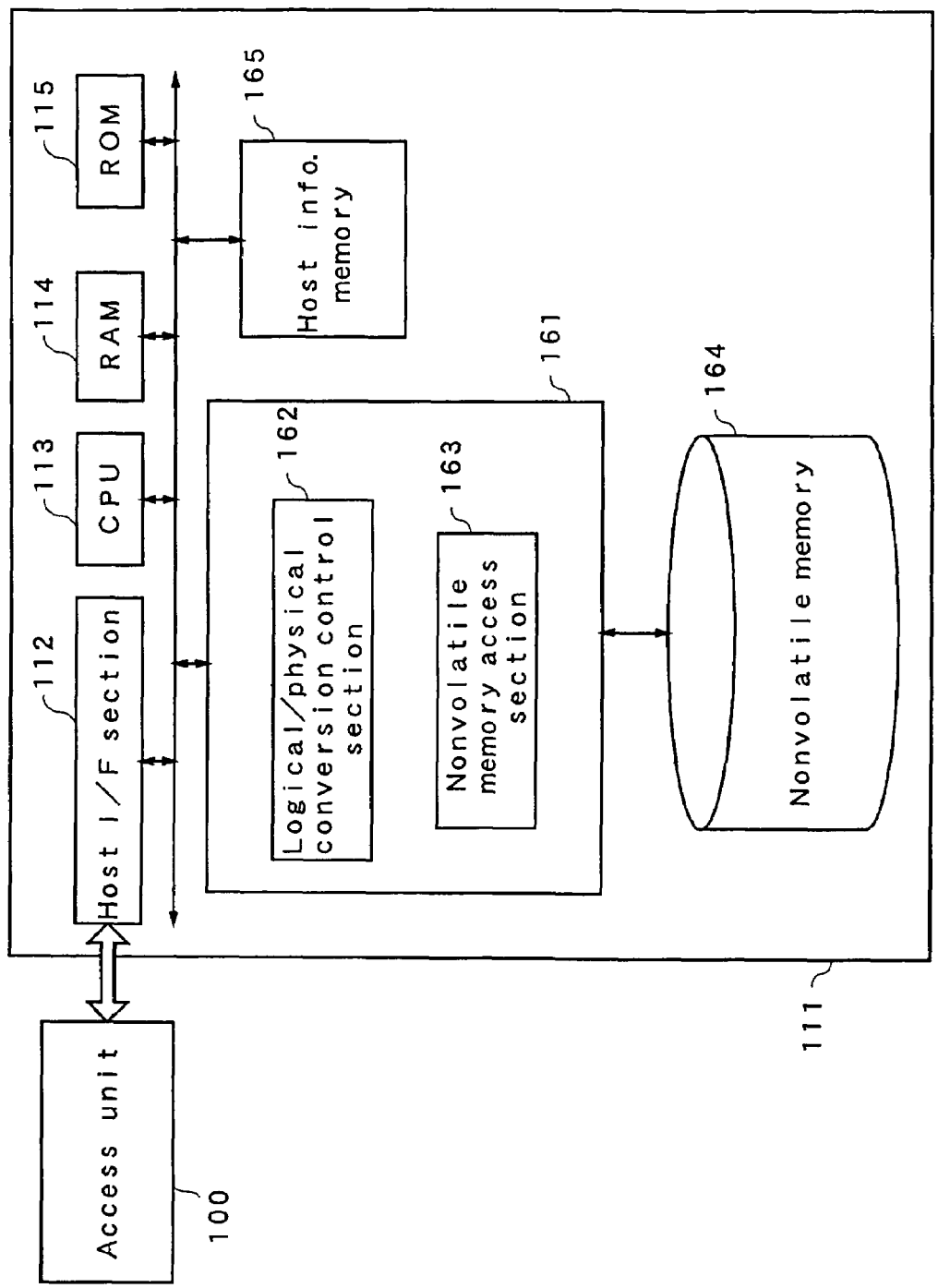
FIG. 17 is an explanatory diagram showing a semiconductor memory card and an access unit according to Embodiment 4 of the present invention.

FIG. 17 is a block diagram showing an access unit and a semiconductor memory card according to Embodiment 4 of the present invention. In FIG. 17, an access unit 100 is connected to a semiconductor memory card 111. The semiconductor memory card 111 includes a host interface (I/F) section 112, a CPU 113, a RAM 114, a ROM 115, a memory controller 161, a nonvolatile memory 164, and a host information memory 165. The host interface section 112 is an interface for sending/receiving control signals and data to/from the access unit 100. The ROM 115 stores a program for controlling the semiconductor memory card 111. The program operates on the CPU 113 using the RAM 114 as a temporary storage area. The memory controller 161 is an element for controlling the nonvolatile memory 164. The nonvolatile memory 164 is a data storage area in the semiconductor memory card 111. The memory controller 164 includes a logical/physical conversion control section 162 and a nonvolatile memory access section 163. The nonvolatile memory access section 163 performs writing, reading, and erasing of data by directly accessing the nonvolatile memory 164 from the memory controller 161.

Further, the host information memory 165 temporarily stores an allocation table update instruction signal from the access unit 100.

Figure 18:
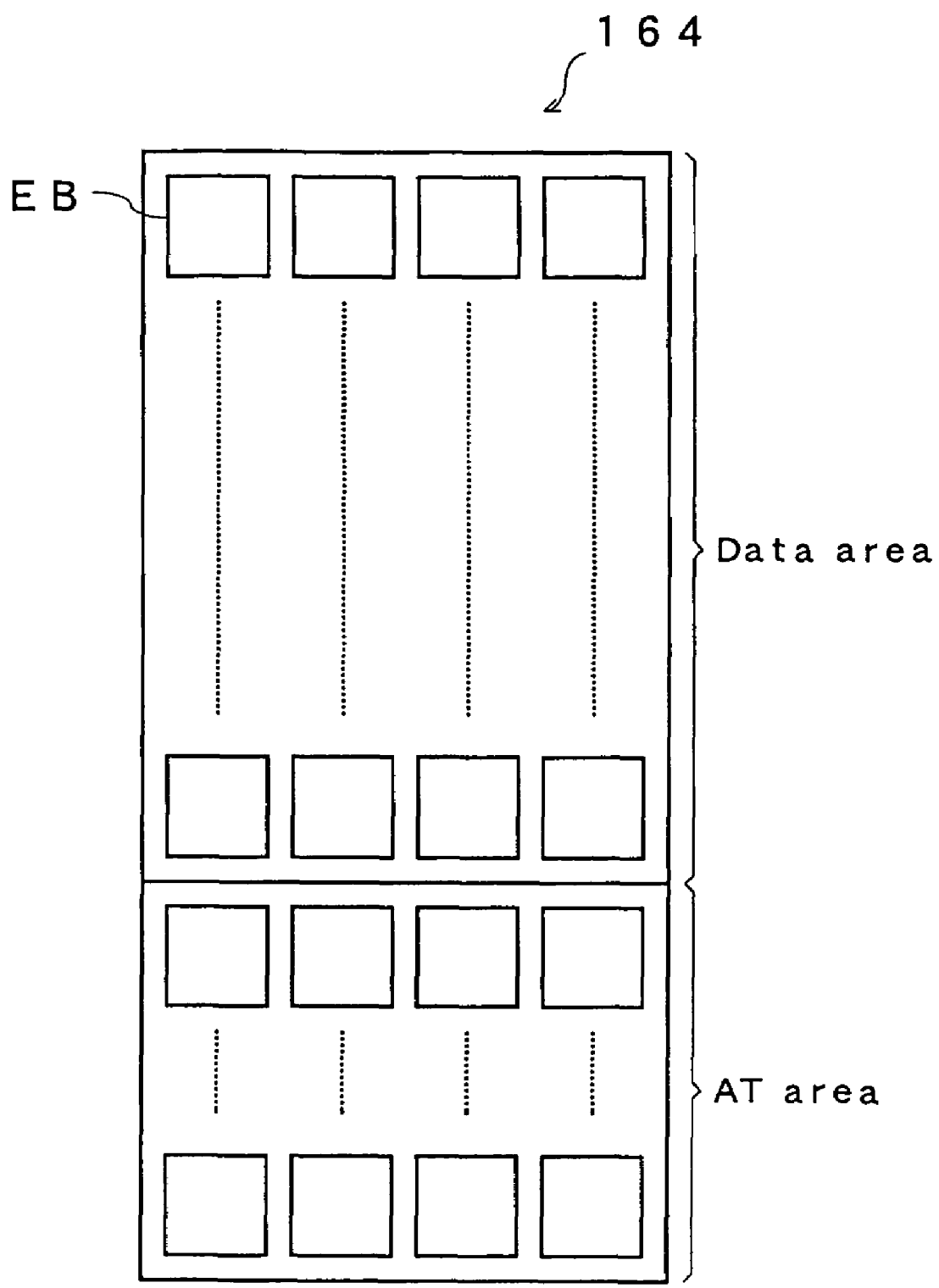
FIG. 18 is an explanatory view showing a configuration of a nonvolatile memory according to Embodiment 4 of the present invention.

FIG. 18 is an explanatory view showing an internal configuration of a nonvolatile memory 164. An erase block and page specifications of the nonvolatile memory 164 are the same as those of the nonvolatile memory chip of Embodiment 2. The nonvolatile memory 164 is different from Embodiments 1 to 3 and address management information is stored in an allocation table (AT) area of the nonvolatile memory 164 in a format type of the logical/physical conversion table and the entry table. Here, the allocation table (AT) denotes a table which the memory controller 161 controls the nonvolatile memory 164. The allocation table area (AT area) is to collectively record AT which is management information in another area different from the data area. If the number of the erase blocks existing in the nonvolatile memory 164 is very large, when the method of producing the logical/physical conversion table and an entry table on the RAM is adopted, based on the management information of the management area in each erase block at initialization as in Embodiments 1 to 3, it takes comparatively much time. Consequently, in the case of using the nonvolatile memory whose number of the erase blocks of is large, an AT management system (hereinafter, referred to as a centralized store system) in which management information is intensively stored in the specified AT area of the nonvolatile memory 164, is adopted in order to shorten the initialization time.

The logical/physical conversion control section 162 includes the logical/physical conversion table and the entry table. Both are stored in volatile memories such as RAM. During initialization immediately after power on, the CPU 113 reads the allocation table on the AT area of the nonvolatile memory 164 to produce the logical/physical conversion table and the entry table on the RAM in the logical/physical conversion control section 162. Reading of data from the AT area, that is, AT read may be only during initialization when AT manages all data areas.

Figure 19:
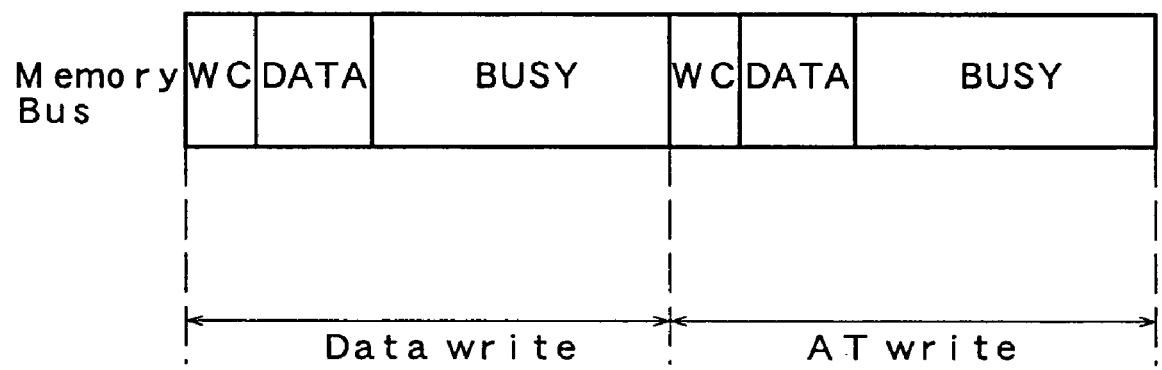
FIG. 19 is a time chart showing a recording process of data in a conventional example.
Figure 20:
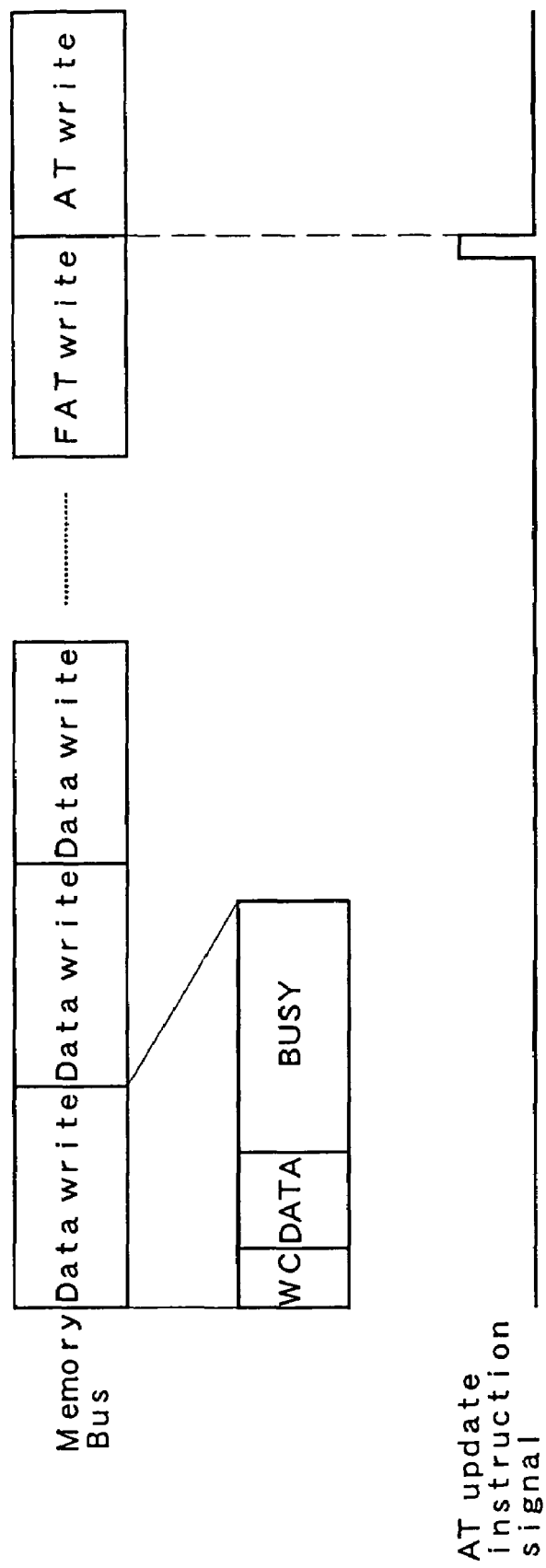
FIG. 20 is a time chart showing a recording process of data according to Embodiment 4 of the present invention.

The operation of the semiconductor memory card and the access unit as configured above will be described with mainly reference to FIGS. 18 to 20. FIG. 19 is an explanatory view showing an access form of the conventional nonvolatile memory access section. FIG. 20 is an explanatory view showing an access mode of the nonvolatile memory access section 163. The conventional semiconductor memory card simultaneously updates the table of the logical/physical conversion control section 162 every writing data by the access unit 100. Accordingly, updated table of the logical/physical conversion control section 162 need to be written back to the nonvolatile memory 164. FIG. 19 shows processing of data write information. Data write denotes a data write period, and AT write denotes processing in which the updated table of the logical/physical conversion control section 162 is written back to the AT area in the nonvolatile memory 164.

The processing performance is degraded by temporal overhead which is required for this AT write. More particularly, when data write capacity is small, proportion of the AT write time to the entire processing time (data write time+AT write time) becomes comparatively large to have a problem.

In the system that the access unit 100 continuously writes user data having in the order of several hundreds kilobytes in size, for example, and a FAT update on the side of the access unit 100 also updates in the order of several hundreds kilobytes, AT may update corresponding to its cycle. The reason is that when a file allocation table (hereinafter, referred to as FAT) is updated and power-off or the like occurs before the completion of writing in the nonvolatile memory 164, FAT is not updated, and therefore, AT also need not update. Meanwhile, it may be said that it is more reasonable if the FAT update matches the AT update. A span of the FAT update differs according to usage of the access unit 100. Accordingly, in order to optimize processing performance corresponding to the usage, timing of the AT update may be controlled by the access unit 100 to transfer an AT update instruction signal. Consequently, in Embodiment 4, the AT update instruction signal, which the access unit 100 instructs the AT update, is used.

In this embodiment, as shown in FIG. 20, writing in the FAT is completed after writing a plurality of data, and then, the AT update instruction signal is supplied to the semiconductor memory card by the access unit 100, that is the host. The AT update instruction signal is first stored in the host information memory 165. The nonvolatile memory access section 163 writes information of the logical/physical conversion table and conversion table in the updated logical/physical conversion control section 162 as AT in the AT area of the nonvolatile memory 164.

As with the above, when also a plurality of data are erased, writing in the FAT is completed, and then, the AT update instruction signal is supplied to the semiconductor memory card by the access unit 100, that is the host. The AT update instruction signal is first stored in the host information memory 165. The nonvolatile memory access section 163 writes information of the logical/physical conversion table and conversion table in the updated logical/physical conversion control section 162 as AT in the AT area of the nonvolatile memory 164. Consequently, temporal overhead when writing in AT can be reduced and processing performance can be improved.

Here, the semiconductor memory card according to this embodiment is a semiconductor memory card used by being connected to an access unit. The semiconductor memory card comprises: a host interface section which sends a control signal and data to the access unit and receives a signal from the access unit; a nonvolatile memory in which a plurality of continuous sectors is grouped to be a block as a minimum unit of data erasing, and in which an address management information area and a user data area are stored in respective different blocks; a memory controller which has a volatile memory holding address management information, performs erasing, writing, and reading of data, and updates the volatile memory in every erasing, and writing of data; and a host information memory which temporarily stores address management information update signal transferred from the access unit. Herein, the memory controller includes a nonvolatile memory access section which writes data transferred when a write command and data are given by the access unit to the nonvolatile memory, erases blocks designated when an erase command is given, and writes address management information held in the volatile memory of the memory controller to the address management information area of the nonvolatile memory when the address management information update signal is held in the host information memory.

Further, the semiconductor memory control method according to this embodiment is a semiconductor memory control method in a semiconductor memory card having a nonvolatile memory in which a plurality of continuous sectors is grouped to be a block as a minimum unit of data erasing, and in which an address management information area and a user data area are stored in respective different blocks. The semiconductor memory control method includes the steps of: updating a volatile memory, which is provided for holding address management information, in every erasing, and writing of data with respect to the nonvolatile memory; temporarily storing an address management information update signal transferred from the access unit in a host information memory; writing data transferred when a write command and data are given by the access unit to the nonvolatile memory; erasing blocks designated when an erase command is given; and writing the address management information held in the volatile memory of the memory controller to the address management information area of the nonvolatile memory when the address management information update signal is held in the host information memory.

INDUSTRIAL APPLICABILITY

A semiconductor memory card and a semiconductor memory control apparatus related to the present invention can realize high speed access with respect to the semiconductor memory card by optimizing processing on either side or on both sides of an access unit and the semiconductor memory card. Such a semiconductor memory card, an access unit, or a method can be applied to digital AV apparatuses, mobile telephone terminals, digital cameras, PCs, and the like in which a semiconductor memory card is used as a recording medium, and more particularly, can suitably function in the case for use in recording media and apparatuses that record high quality AV data having a high transfer rate.

The invention claimed is:

1. A semiconductor memory card used by being connected to an access unit, comprising:
    a host interface section which sends a control signal and data to said access unit and receives a signal from said access unit;
    a nonvolatile memory which includes a plurality of nonvolatile memory chips and in which a plurality of continuous sectors is grouped to be a block as a minimum unit of data erasing;
    a memory controller which is connected to each of said plurality of nonvolatile memory chips with a bidirectional bus and controls erasing, writing, and reading of data; and
    a host information memory which temporarily stores a write speed mode given by said access unit,
    wherein said memory controller performs, in parallel, writing with respect to said plurality of nonvolatile memory chips when the write speed mode stored in said host information memory is a high speed mode, and sequentially performs writing with respect to said plurality of nonvolatile memory chips when the write speed mode stored in said host information memory is a low speed mode.

2. A semiconductor memory apparatus used by being connected to an access unit, comprising:
    a host interface section which sends a control signal and data to said access unit and receives a signal from said access unit;
    a nonvolatile memory which includes a plurality of nonvolatile memory chips and in which a plurality of continuous sectors is grouped to be a block as a minimum unit of data erasing;
    a memory controller which is connected to each of said plurality of nonvolatile memory chips with a bidirectional bus and controls erasing, writing, and reading of data; and
    a host information memory which temporarily stores a write speed mode given by said access unit,
    wherein said memory controller performs, in parallel, writing with respect to said plurality of nonvolatile memory chips when the write speed mode stored in said host information memory is a high speed mode, and sequentially performs writing with respect to said plurality of nonvolatile memory chips when the write speed mode stored in said host information memory is at a low speed mode.

3. A semiconductor memory control method in a semiconductor memory card having a nonvolatile memory which includes a plurality of nonvolatile memory chips and in which a plurality of continuous sectors is grouped to be a block as a minimum unit of data erasing and a host information memory for temporarily storing a write speed mode given by an access unit, said semiconductor memory control method comprising the steps of:
    performing, in parallel, writing with respect to said plurality of nonvolatile memory chips when the write speed mode stored in said host information memory is a high speed mode, and
    sequentially performing writing with respect to said plurality of nonvolatile memory chips when the write speed mode stored in said host information memory is a low speed mode.

* * * * *

UNITED STATES PATENT AND TRADEMARK OFFICE
CERTIFICATE OF CORRECTION

PATENT NO. : 7,654,466 B2 Page 1 of 1
APPLICATION NO. : 10/553725
DATED : February 2, 2010
INVENTOR(S) : Maeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Eighteenth Day of January, 2011

David J. Kappos
*Director of the United States Patent and Trademark Office*